(12) United States Patent
Lin

(10) Patent No.: US 10,248,543 B2
(45) Date of Patent: Apr. 2, 2019

(54) SOFTWARE FUNCTIONAL TESTING

(71) Applicant: Dennis Lin, San Jose, CA (US)

(72) Inventor: Dennis Lin, San Jose, CA (US)

( * ) Notice: Subject to any disclaimer, the term of this patent is extended or adjusted under 35 U.S.C. 154(b) by 0 days.

(21) Appl. No.: 15/497,172

(22) Filed: Apr. 25, 2017

(65) Prior Publication Data

US 2018/0307591 A1  Oct. 25, 2018

(51) Int. Cl.
  *G06F 11/36*  (2006.01)
  *G06K 9/78*   (2006.01)
  *G06K 9/00*   (2006.01)

(52) U.S. Cl.
  CPC ...... *G06F 11/3668* (2013.01); *G06K 9/00335* (2013.01); *G06K 9/78* (2013.01)

(58) Field of Classification Search
  CPC ............ G06F 11/3676; G06F 11/3668; G06F 11/3688
  See application file for complete search history.

(56) References Cited

U.S. PATENT DOCUMENTS

| | | | |
|---|---|---|---|
| 5,371,883 A | 12/1994 | Gross | |
| 8,401,221 B2* | 3/2013 | Milov | G06F 9/45512 382/100 |
| 9,311,222 B1* | 4/2016 | Avery | G06F 3/0481 |
| 2011/0214107 A1* | 9/2011 | Barmeir | G06F 11/3684 717/125 |
| 2012/0218396 A1* | 8/2012 | Benatar | H04N 7/183 348/77 |
| 2013/0019170 A1* | 1/2013 | Mounty | G06F 11/3688 715/704 |
| 2016/0048443 A1* | 2/2016 | Ligman | G06F 11/3664 717/125 |

OTHER PUBLICATIONS

Chang et al. "GUI Testing Using Computer Vision". ACM. Apr. 2010.*
International Application No. PCT/US2018/029467, International Search Report and Written Opinion dated Jul. 20, 2018.

* cited by examiner

*Primary Examiner* — Yolanda L Wilson
(74) *Attorney, Agent, or Firm* — Sheppard, Mullin, Richter & Hampton LLP

(57) ABSTRACT

Systems and methods for functionally testing software using computer vision. Systems can include a functional testing computer vision system and a computer vision-based functional testbed system. Methods can include generating a computer vision-based testing package and functionally testing software on at least one virtualized testbed machine using the computer vision-based testing package.

20 Claims, 10 Drawing Sheets

SOFTWARE FUNCTIONAL TESTING

DETAILED DESCRIPTION

Figure 1:
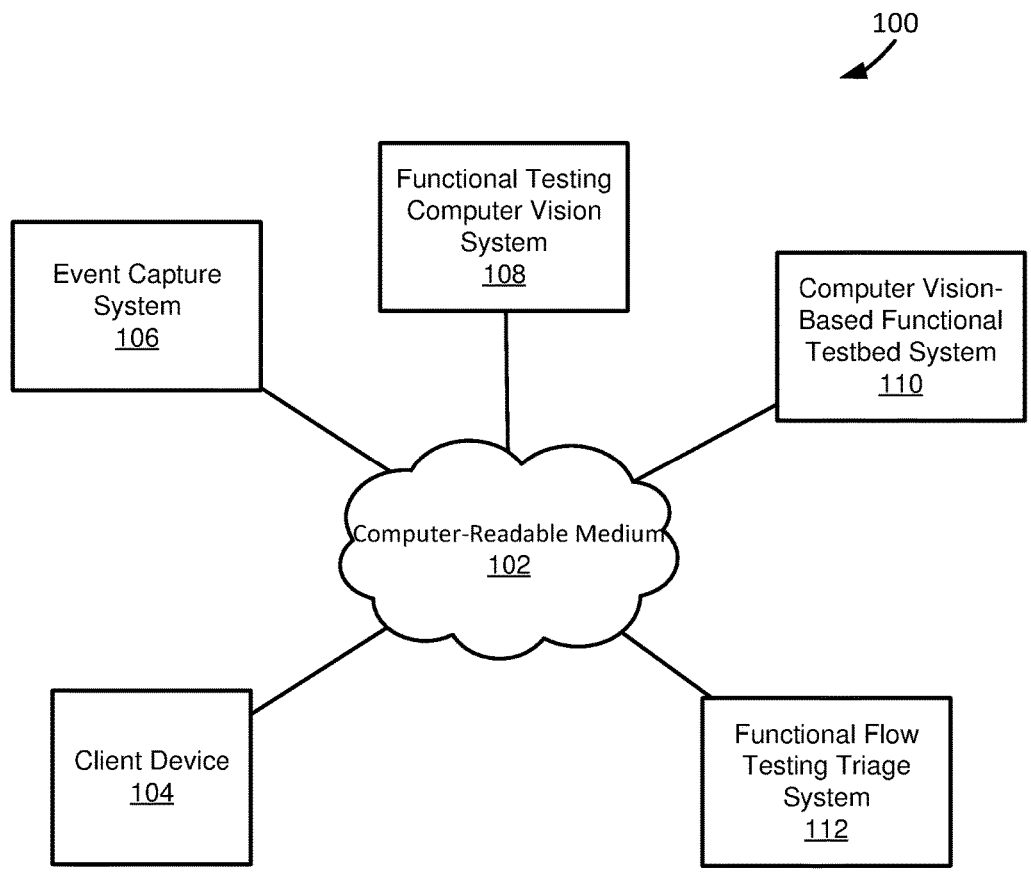
FIG. 1 depicts a diagram of an example of a system for performing functional testing of software using computer vision.

FIG. 1 depicts a diagram 100 of an example of a system for performing functional testing of software using computer vision. The system of the example of FIG. 1 includes a computer-readable medium 102, a client device 104, an event capture system 106, a functional testing computer vision system 108, a computer vision-based functional testbed system 110, and a functional flow testing triage system 112. In the example system in FIG. 1, the client device 104, the event capture system 106, the functional testing computer vision system 108, the computer vision-based functional testbed system 110, and the functional flow testing triage system 112 are coupled to each other through the computer-readable medium 102.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

Assuming a computer-readable medium includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (hereinafter referred to as "HTTP") for hypertext markup language (hereinafter referred to as "HTML") documents that make up the World Wide Web (hereinafter referred to as "the web"). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. As used in this paper, edge devices include applicable devices at an edge of one or a combination of a LAN, a WLAN, a consumer network, and an enterprise network. For example, an edge device can be a networking device, at an edge of a LAN, providing wireless access to network services through a WLAN. In another example, an edge device can be an IoT device accessing network services through a LAN. In yet another example, an edge device can be an IoT device transmitting data through at least a portion of a wired connection, e.g. a Universal Serial Bus (hereinafter referred to as "USB") connection. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. That is, the engine includes hardware. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The example system shown in FIG. 1 functions to perform or otherwise facilitate functional testing of software. Functional testing of software, as used in this paper, includes testing software by executing the software according to certain input, e.g. testing input, and examining the output from executing the software according to the input. Testing input can specify ways in which to execute software as part of functionally testing the software. For example, if testing input indicates a user activates a specific icon in interacting with an application, then functional testing the software can include executing the software as if the user activated the specific icon to generate an output of executing the software as if the user activated the specific icon. Functional testing can include black-box like testing, where observation of actual execution of code or instructions of an application based on testing input is ignored while only the output of the actual execution of the code is determined. For example, functional testing can include a graphical representation of output of an application executed according to testing input without observation of internal program structure in the execution of the application according to the testing input. Functional testing can include comparing an actual output of executing software according to testing input to an expected output of executing the software according to the testing input. For example, functional testing can include comparing an actual output of executing an application when a user activates an icon to an expected output of executing the application when a user activates the icon. An expected output of executing software according to testing input can be indicated by an applicable source describing desired or otherwise proper output of software in execution. For example, an expected output of executing software can be indicated by specifications for the software or expected output indications received from a user, e.g. a software developer or tester.

The example system shown in FIG. 1 functions to perform testing of software using computer vision. In using computer vision to perform testing on software, the example system shown in FIG. 1 can create a computer vision testing package used in performing functional testing of software on a testbed machine. A computer vision-based testing package can include applicable data created, at least in part, using computer vision. Specifically, a computer vision-based testing package can include graphical elements in a graphical representation of output of executing software and properties of the identified elements. For example, a computer vision-based testing package can include an identification of an icon in a graphical representation of output of executing software and logic to follow in execution of the software if the icon is activated. Additionally, a computer vision-based testing package can include executable code or portions of executable code of software. For example, a computer vision-based testing package can include a portion of code to execute when a user activates an icon in interacting with a graphical representation of output of executing software. In another example, a computer vision-based testing package is a script package and includes code in a scripting language, hereinafter referred to as script, capable of being executed based on user interactions with a graphical representation of output of executing software. In using computer vision to perform testing on software, costs and maintenance requirements in testing software are reduced.

In a specific implementation, a computer vision-based testing package includes images or videos used to generate the computer vision-based testing package. For example, if a video shows a user activating or attempting to activate an icon, then a computer vision-based testing package can include the video of the user activating or attempting to activate the icon. Further in the example, the computer vision-based testing package can include script associated with activating the icon in executing the software for purposes of performing functional testing of the software.

In a specific implementation, a computer vision-based testing package used by the example system shown in FIG. 1 to perform functional testing of software includes testing input for use in performing functional testing of software. Testing input includes applicable input for use in determining how to execute software as part of performing functional testing of the software. For example, testing input can indicate to execute code associated with activating an icon in a graphical representation of output of executing software. Testing input can be generated based on events associated with user interaction with a graphical representation of output of executing software. For example, if a user activates an icon in a graphical representation of output of executing software, then testing input can specify execute script associated with activating the icon. Additionally, testing input can be generated based on applicable input received from a user. For example, if a user, in an audio recording, states that they want to opening a specific file in executing software, then testing input can include the audio recording and specify to execute script associated with opening the specific file in the execution of the software.

In the example system shown in FIG. 1, the client device 104 is intended to represent a device that functions to be utilized by a user in sending and receiving data for purposes of performing functional testing of software. Specifically, the client device 104 can be used to send code of software to be tested. Additionally, the client device 104 can be used to send a conceptualization or abstraction of software to be tested. For example, the client device 104 can be utilized by a user to provide a mockup of a website. The client device 104 can be utilized by a user to receive functional testing results of performing functional testing of software. Functional testing results can include applicable data related to functionally testing software using computer vision. For example, functional testing results can include one or a combination of a notification software was functionally tested, code executed as part of functionally testing software, code generated or modified as part of functionally testing software, problems encountered and errors found in functionally testing software, testbed machine characteristics of a testbed machine used to functionally test software, and images or videos of a graphical representation of output of software executing as part of functionally testing the software. In a specific example, functional testing results can include code used to interact with a website generated by functionally testing the website.

In a specific implementation the client device 104 includes a graphical display. A graphical display of the client device 104 can be utilized by a user to interact with a graphical representation of output of executing software, potentially as part of the software being functionally tested. Additionally, a graphical display of the client device 104 can be utilized by a user to interact with a conceptualization or abstraction of software. For example, a graphical display of the client device 104 can be utilized by a user to interact with a mock-up of a website. A user can view functional testing results using a graphical display of the client device 104. Additionally, a user can view functional testing results in real time as functional testing is performed on software through a graphical display of the client device 104. For example, through a graphical display of the client device 104, a user can view images or video in real time of a graphical representation of an output of software executing as it is being functionally tested. Further in the example, through a graphical display of the client device 104, a user can view a popup box code executed as the software is functionally executed.

In a specific implementation, the client device 104 functions to provide a test harness for use in performing functional testing of software. A test harness can include applicable data used in performing functional testing of software.

Specifically, a test harness can include either or both code or portions of code used in executing software and functions in executing the software associated with the code or the portions of code. For example, a test harness provided by the client device 104 can include a call to functions used in functionally specific portions of software. Additionally, a test harness provided by the client device can include 104 testing input. For example, testing input included as part of a test harness can specify to open a specific file using software under test and a specific icon in a graphical representation of executing software to activate.

In the example system shown in FIG. 1, the event capture system 106 is intended to represent a system that functions to capture user interactions with a graphical display for purposes of controlling functional testing of software. The event capture system 106 can capture user interactions with a graphical representation of an output of executing software for purposes of functionally testing the software. For example, the event capture system 106 can capture a user activating or attempting to activate an icon in a graphical representation of an output of executing software, generated as the software is functionally tested. Additionally, the event capture system 106 can capture user interactions with a graphical representation of an abstraction of software for purposes of functionally testing the software. For example, the event capture system 106 can capture user interactions with a mockup of a webpage for purposes of functionally testing the webpage. In capturing user interaction with a graphical display for purposes of controlling functional testing of software, the event capture system can generate videos or images showing a user's interactions with a graphical display. For example, the event capture system 106 can capture a video of a user activating an icon in a graphical representation of an output of software executing.

In a specific implementation, the event capture system 106 functions to be implemented at an applicable device to capture user interaction with a graphical display for purposes of functionally testing software. The event capture system 106 can be implemented as a camera separate from a user device for purposes of capturing user interaction with a graphical display of the user device. For example, the event capture system 106 can be implemented as a camera positioned over a should of a user and configured to capture the user's interactions with a graphical display of a graphical representation of output of software executing. Further the event capture system 106 can be implemented at a client device. For example, the event capture system 106 can be implemented at a client device and configured to capture a video or screen shots of a graphical representation of user interactions with an abstraction of software presented to a user through the client device.

In the example system shown in FIG. 1, the functional testing computer vision system 108 is intended to represent a system that functions to generate data used in testing software using computer vision. In generating data used in testing software, the functional testing computer vision system 108 can generate a computer vision-based testing package using computer vision. For example, the functional testing computer vision system 108 can use computer vision to recognize graphical elements in a graphical representation of output of executing software to be tested. In another example, the functional testing computer vision system 108 can use computer vision to recognize elements in a graphical representation of a mockup of a website to be tested. The functional testing computer vision system 108 can use an applicable computer vision method for generating a computer vision-based testing package. For example, the functional testing computer vision system 108 can utilize machine vision to recognize graphical elements in software being functionally tested. In another example, the functional testing computer vision system 108 can apply machine learning to user manually identified elements to automatically identify objects through computer vision. In yet another example, the functional testing computer vision system 108 can use graphical user interface scripting to generate a computer vision-based testing package.

In a specific implementation, the functional testing computer vision system 108 functions to generate a computer vision-based testing package used in testing software based on input received from a user. For example, if user input indicates functions associated with elements in a graphical representation of output of executing software, then the functional testing computer vision system 108 can generate a computer vision-based testing package associating the functions with the element. Additionally, the functional testing computer vision system 108 can utilize audio input received from a user to generate a computer vision-based testing package. For example, if a user provides audio input of a specific question the user asks software in interacting with the software, then the functional testing computer vision system 108 can generate audio input indicating to execute the software as if a user is asking the software the specific question as part of functionally testing the software.

In a specific implementation, the functional testing computer vision system 108 functions to generate a computer vision-based testing package according to user interactions with a graphical display. The functional testing computer vision system 108 can generate a computer vision-based testing package according to user interactions with a graphical display captured by an applicable system for capturing user interactions with a graphical display, such as the event capture systems described in this paper. The functional testing computer vision system 108 can generate a computer vision-based testing package according to user interactions with a graphical representation of output of executing software. For example, if a user activates an icon in a graphical representation of output of executing software under test, then the functional testing computer vision system 108 can generate a computer vision-based testing package with testing input indicating to execute code associated with activating the icon. Additionally, the functional testing computer vision system 108 can generate a computer vision-based testing package according to user interactions with a graphical representation of an abstraction of software under test. For example, the functional testing computer vision system 108 can generate a computer vision-based testing package for use in functionally testing a website based on user interactions with a graphical representation of a mockup of the website.

In a specific implementation, the functional testing computer vision system 108 functions to recognize user interactions with a graphical display using computer vision in order to generate a computer vision-based testing package. The functional testing computer vision system 108 can recognize user interactions with a graphical representation of either or both an output of executing software or an abstraction of software under test for purposes of generating computer vision-based testing package. For example, the functional testing computer vision system 108 can determine testing input from user interactions with a graphical representation of an output of executing software recognized through computer vision. Further in the example, the functional testing computer vision system 108 can subsequently generate a computer vision-based testing package based on the determined testing input.

In a specific implementation, the functional testing computer vision system 108 functions to create testing input for use in controlling functional testing of software. The functional testing computer vision system 108 can create testing input for inclusion in a computer vision-based testing package and use in functionally testing software. The functional testing computer vision system 108 can create testing input based on one or a combination of input received from a user, user interactions with a graphical representation of an abstraction of software, and user interactions with a graphical representation of an output of executing software. For example, if input received from a user indicates testing constraints for performing functional testing of software, then the functional testing computer vision system 108 can generate a computer vision-based testing package including indications of the testing constraints.

In a specific implementation, the functional testing computer vision system 108 functions to create a computer vision-based testing package using received code for software. In using received code to create a computer vision-based testing package, the functional testing computer vision system 108 can associate the code with functions performed when the code is executed. For example, if code is executed when a user activates an element in a graphical representation of output of executing software, then the functional testing computer vision system 108 can associate the code with the function of activation of the element. Additionally, the functional testing computer vision system 108 can use modified code to create a computer vision-based testing package. For example, if a user modifies code and provides the modified code as a result of functional testing of software, then the functional testing computer vision system 108 can include the modified code in a computer vision-based testing package for use in further testing of the software.

In a specific implementation, the functional testing computer vision system 108 functions to create a computer vision-based testing package using a received test harness. Specifically, the functional testing computer vision system 108 can create a computer vision-based testing package based upon a test framework included as part of a received test harness. For example, the functional testing computer vision system 108 can determine testing input, e.g. testing constraints, for testing software from a test harness and subsequently generate a computer vision-based testing package including the determined testing input. Testing input can include specific functions to call with parameters in functionally testing software.

In a specific implementation, the functional testing computer vision system 108 functions to create a computer vision-based testing package including a script package. The functional testing computer vision system 108 can use an applicable computer vision method, such as graphical user interface scripting, to generate a computer vision-based testing package including a script package. In creating a computer vision-based testing package including a script package, the functional testing computer vision system 108 can generate script for performing functions associated with user interactions with a graphical representation of output of executing software. Additionally, the functional testing computer vision system 108 can associate script for performing functions with elements in a graphical representation of output of executing software. The functional testing computer vision system 108 can generate script by simulating user interactions with a graphical representation of output of executing software and use computer vision to identify the interactions and elements in the graphical representation which can subsequently be associated with the script. Further, the functional testing computer vision system 108 can generate script and associate the script with elements based on user input. For example, the functional testing computer vision system 108 can generate script based on user input indicating functions associated with activating an element in a graphical representation of an output of executing software.

In the example system shown in FIG. 1, the computer vision-based functional testbed system 110 is intended to represent a system that functions to manage functional testing of software on a testbed machine. The computer vision-based functional testbed system 110 can manage functional testing of software using a computer vision-based testing package. The computer vision-based functional testbed system 110 can receive a computer vision-based testing package from an applicable system for generating data for use in functionally testing software, such as the functional testing computer vision systems described in this paper. In functionally testing software, the computer vision-based functional testbed system 110 can execute code in a computer vision-based testing package according to testing input. For example, the computer vision-based functional testbed system 110 can execute script included in a script package according to testing input indicated in the script package to functionally test software.

In a specific implementation, the computer vision-based functional testbed system 110 functions to virtualize a testbed machine for use in executing code on the testbed machine as part of functionally testing software. The computer vision-based functional testbed system 110 can virtualize a testbed machine remote from a client device utilized by a user in functionally testing software. For example, the computer vision-based functional testbed system 110 can virtualize a testbed machine on purchased server space. In virtualizing a testbed machine, the computer vision-based functional testbed system 110 can configure the testbed machine according to specific testbed machine characteristics. Testbed machine characteristics include applicable characteristics for configuring a testbed machine to operate according to in testing software. For example, the computer vision-based functional testbed system 110 can configure a testbed machine to operate as an Android® device using the Android® operating system at a specific output display size. Additionally, the computer vision-based functional testbed system 110 can configure a testbed machine based on input received from a user, e.g. indicating testbed machine characteristics. For example, if a computer vision-based testing package indicates a user wants to functionally test software on a device operating a specific version of an operating system, then the computer vision-based functional testbed system 110 can configure a testbed machine to operate on the specific version of the operating system.

In a specific implementation, the computer vision-based functional testbed system 110 functions to perform functional testing analysis of functional testing of software to generate functional testing analytics data. Functional testing analytics data includes application data generated by performing functional testing analysis. The computer vision-based functional testbed system 110 can perform functional testing analysis by examining output of executing software in response to testing input. In performing functional testing analysis of functional testing of software, the computer vision-based functional testbed system 110 can compare outputs of executing software on the same testbed machine two different times according to the same testing input. For example, if a dialog box appears when software is executed on a testbed machine a first time and fails to appear when software is executed on the testbed machine a second time, then the computer vision-based functional testbed system 110 can highlight the problem of the dialog box failing to appear, as part of performing functional testing analysis of functional testing of the software.

In a specific implementation, the computer vision-based functional testbed system 110 functions to perform functional testing analysis based on a frequency at which elements change in a graphical representation of output of software executing on a testbed machine as part of functional testing. Specifically, as part of performing functional testing analysis, the computer vision-based functional testbed system 110 can highlight elements that change frequently or fail to change frequently in a graphical representation of output of software executing on the same testbed machine multiple times. Additionally, as part of performing functional testing analysis based on a frequency at which elements change, the computer vision-based functional testbed system 110 can highlight elements that change frequently or infrequently in a graphical representation of output of software executing multiple times on the same testbed machine according to the same testing input.

In a specific implementation, the computer vision-based functional testbed system 110 functions to perform functional testing analysis based on a degree of change of an element in a graphical representation of output of software executing on a testbed machine as part of functional testing of the software. Specifically, as part of performing functional testing analysis, the computer vision-based functional testbed system 110 can highlight elements that change a specific amount in a graphical representation of output of software executing on the same testbed machine multiple times. For example, if an element of a graphical representation of an output of executing software changes in size greater than specific threshold amounts when the software is executed multiple times on a testbed machine, then the computer vision-based functional testbed system 110 can highlight the element. Additionally, as part of performing functional testing analysis based on a degree of change of elements, the computer vision-based functional testbed system 110 can highlight elements in a graphical representation of output of software executing multiple times on the same testbed machine according to the same testing input based on the degree in which the elements change in the graphical representation when the software is executed multiple times.

In a specific implementation, the computer vision-based functional testbed system 110 functions to perform functional testing analysis by comparing an actual output of executing software to an expected output of executing the software according to testing input. In comparing an actual output to an expected output of executing software, the computer vision-based functional testbed system 110 can compare a graphical representation of the actual output of the executing software to a graphical representation of the expected output of the executing software as part of functionally testing the software. For example, the computer vision-based functional testbed system 110 can compare an element in a graphical representation of an actual output of executing software with an element in a graphical representation of an expected output of executing the software to determine either or both a frequency at which the element changes or a degree to which the element changes, as part of performing functional testing analysis of the software.

In a specific implementation, the computer vision-based functional testbed system 110 functions to use computer vision to perform functional testing analysis of software. In using computer vision to perform functional testing analysis of software, the computer vision-based functional testbed system 110 can use computer vision to detect changes in graphical representations of output of software executing as part of functional testing of the software. Specifically, the computer vision-based functional testbed system 110 can use computer vision to detect either or both a frequency and a degree to which elements change in a graphical representation of an output of software executing as part of functionally testing the software. For example, the computer vision-based functional testbed system 110 can use computer vision to determine a frequency at which an element in a graphical representation of an output of executing software changes when the software is executed multiple times according to the same testing input as part of functionally testing the software. In another example, the computer vision-based functional testbed system 110 can use computer vision to determine a degree to which an element changes in a graphical representation of an output of executing software when the software is executed multiple times according to the same testing input as part of functionally testing the software.

In a specific implementation, the computer vision-based functional testbed system 110 functions to generate functional testing results. The computer vision-based functional testbed system 110 can generate functional results to include functional testing analytics data generated by performing functional testing analysis. For example, the computer vision-based functional testbed system 110 can generate functional testing results including elements highlighted based on either or both a frequency at which the elements change and a degree to which the elements change in a graphical representation of an output of executing software as part of functional testing of the software. Additionally, the computer vision-based functional testbed system 110 can generate functional testing results based on an output of executing software as part of functionally testing the software. For example, the computer vision-based functional testbed system 110 can generate functional testing results data used to reproduce either or both a graphical representation of an output of executing software and a graphical representation of code executed in executing the software. In another example, the computer vision-based functional testbed system 110 can generate functional testing results data including code generated created through executing software as part of functionally testing the software.

In a specific implementation, the computer vision-based functional testbed system 110 functions to provide functional testing results of functionally testing software to a user, through an applicable device utilized by the user, such as the client devices described in this paper. In providing functional testing results, the computer vision-based functional testbed system 110 can provide functional testing analytics data generated through performing functional testing analysis to a user. For example, the computer vision-based functional testbed system 110 can provide functional testing analytics data indicating elements in a graphical representation of an output of executing software highlighted based on either or both a degree and a frequency at which the elements change in the representation. Additionally, in providing functional resting results, the computer vision-based functional testbed system 110 can provide a stream data used to produce a graphical representation of an output of software executing as part of functionally testing the software. For example, the computer vision-based functional testbed system 110 can provide a stream of data used to reproduce a graphical representation of an output of software executing as part of functionally testing the software using a computer vision-based testing package.

In a specific implementation, the computer vision-based functional testbed system 110 functions to either or both modify and generate code of software as part of functionally testing the software. The computer vision-based functional testbed system 110 can modify or generate code of software based on results of functionally testing software. For example, if in functionally testing software a function of the software fails, then the computer vision-based functional testbed system 110 can modify code of the software in order to correct the function of the software. In another example, the computer vision-based functional testbed system 110 can generate code in functionally testing software according to testing input. In modifying and generating code of software as part of functionally testing the software, the computer vision-based functional testbed system 110 can modify a computer vision-based testing package used in functionally testing the software. For example, the computer vision-based functional testbed system 110 can modify a script package used in functionally testing software by modifying code used in executing the software and included as part of the script package. The computer vision-based functional testbed system 110 can provide modified and generated code to a user, whereinafter the user can re-submit the modified and generated code for further functional testing of the software. For example, the computer vision-based functional testbed system 110 can provide a modified computer vision-based testing package to a user, and the user can subsequently submit the modified computer vision-based testing package for use in further performance of functional testing of software.

In a specific implementation, the computer vision-based functional testbed system 110 can modify code as part of functionally testing software based on received modification input. Modification input can be received from an applicable source, such as a client device or an applicable system for performing automated recovery of a flow of executing software in functionally testing the software, such as the functional flow testing triage systems described in this paper. For example, modification input can include user input indicating modifications to make to code of software in response to problems identified through functional testing of the software. In another example, modification input can include recovery input indicating steps to take, including code modifications to make, in recovering a flow of executing software in functionally testing the software.

In the example system shown in FIG. 1, the functional flow testing triage system 112 is intended to represent a system that functions to automatically perform recovery of a flow of executing software in functionally testing the software. In automatically performing recovery, the functional flow testing triage system 112 can generate and provide recovery input for recovering a flow of executing software in functionally testing the software. Recovery input identifies applicable steps and instructions for recovering a flow of executing software in functionally testing the software. For example, recovery input can identify code to modify in order to make a function of activating an icon work while functionally testing software. In another example, recovery input can identify modification to make to a script in a script package used in functionally testing software.

In a specific implementation, the functional flow testing triage system 112 functions to use recovery strategies in automatically performing recovery of a flow of executing software in functionally testing the software. Recovery strategies include applicable rules and conditions for automatically recovering a flow of executing software, e.g. for purposes of functionally testing the software. For example, recovery strategies can specify that if a specific function fails to execute in functionally testing software, then either or both executing another function before executing the specific function, and modifying code to execute the another function before executing the specific function. Recovery strategies can be maintained based on input received from an applicable source. For example, recovery strategies can be maintained based on input received from a software developer of software subject to functional testing. Additionally, recovery strategies can be maintained based through machine learning or an applicable automated process. For example, recovery strategies can be maintained based on previous functional testing of software. Further in the example, recovery strategies can be maintained based on previous functional testing of software of the same type as software currently being functionally tested.

In a specific implementation, the functional flow testing triage system 112 functions to automatically perform recovery of a flow of executing software in functionally testing the software based on output of executing the software in functionally testing the software. The functional flow testing triage system 112 can compare an actual output of executing software with an expected output of executing the software to perform recovery of a flow of execution of the software in functionally testing the software. For example, the functional flow testing triage system 112 can determine ways in which software is not operating as expected, e.g. from functional testing results generated by comparing actual and expected output, and subsequently generate recovery input for use in recovering a flow of execution of the software in functionally testing the software. Additionally, the functional flow testing triage system 112 can use application of computer vision to output of executing software for purposes of functionally testing the software to perform recovery of a flow of execution of the software. For example, the functional flow testing triage system 112 can use an identification that an element is not functioning properly, e.g. as identified by functional testing results and recognized through computer vision, to perform recovery of a flow of execution of the software for purposes of functionally testing the software.

In an example of operation of the example system shown in FIG. 1, the client device 104 presents to a user a graphical representation of output of executing software for purposes of functionally testing the software. In the example of operation of the example system shown in FIG. 1, the event capture system 106 captures images of the user interacting with the graphical representation of the output of the executing software presented to the user through the client device 104. Further, in the example of operation of the example system shown in FIG. 1, the functional testing computer vision system 108 applies computer vision to the images to recognize user interactions with the graphical representation of the output of the executing software. In the example of operation of the example system shown in FIG. 1, the functional testing computer vision system 108 generates a computer vision-based testing package for purposes of functionally testing the software based on the user interactions with the graphical representation of the output of the executing software identified using computer vision. Additionally, in the example of operation of the example system shown in FIG. 1, the computer vision-based functional testbed system 110 manages functional testing of the software on at least one virtualized testbed machine using the computer vision-based testing package. In the example of operation of the example system shown in FIG. 1, the functional flow testing triage system 112 performs automatic recovery of a flow of the executing software as it is executed on the at least one virtualized testbed machine as part of functionally testing the software.

Figure 2:
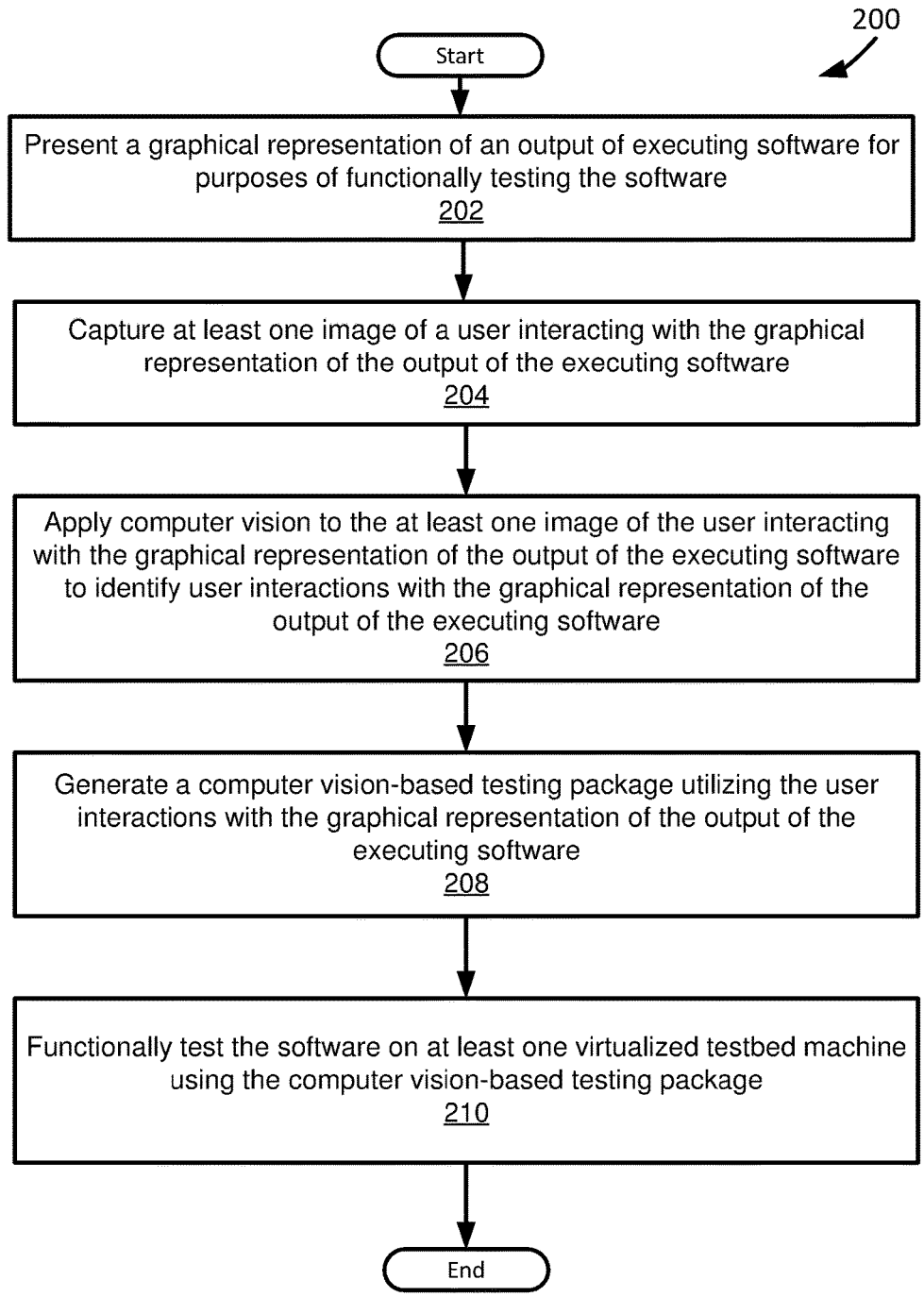
FIG. 2 depicts a flowchart of an example of a method for functionally testing software using computer vision.

FIG. 2 depicts a flowchart 200 of an example of a method for functionally testing software using computer vision. The flowchart 200 begins at module 202, where a graphical representation of an output of executing software is presented to a user for purposes of functionally testing the software. An applicable device, such as the client devices described in this paper, can be used to present to a user a graphical representation of an output of executing software for purposes of functionally testing the software. In presenting to a user a graphical representation of an output of executing software, an abstraction of software can be presented to a user. For example, a mockup of a website can be presented to a user that a user can interact with for purposes of functionally testing the software.

The flowchart 200 continues to module 204, where at least one image of the user interacting with the graphical representation of the output of the executing software is captured. An applicable system for capturing user interaction with a graphical representation of the output of executing software, such as the event capture systems described in this paper, can capture at least one image of the user interacting with the graphical representation of the output of the executing software. For example, a camera positioned to have a view of the graphical representation of the output of executing software can capture at least one image of the user interacting with the graphical representation of the output of the executing software. In another example, a screen capture application, integrated as part of a client device, can capture at least one image of the user interacting with the graphical representation of the output of the executing software through a display integrated as part of the client device.

The flowchart 200 continues to module 206, where computer vision is applied to the at least one image of the user interacting with the graphical representation of the output of the executing software to identify user interactions with the graphical representation of the output of the executing software. An applicable system for applying computer vision to generate data used in functionally testing software, such as the functional testing computer vision systems described in this paper, can apply computer vision to the at least one image of the user interacting with the graphical representation of the output of the executing software to identify the user interactions with the graphical representation of the output of the executing software. For example, computer vision can be applied to determine elements a user activates in interacting with the graphical representation of the output of the executing software. Further in the example, computer vision can be applied to determine changes to the graphical representation of the output of the executing software in response to the user interacting with the graphical representation of the output the executing software. Additionally, in applying computer vision to the at least one image to identify user interactions with the graphical representation of the output of the executing software, graphical elements in the graphical representation of the output of the executing software can be identified. For example, an icon in a graphical representation of the output of the executing software can be identified from the at least one image using computer vision.

In a specific implementation, computer vision is applied to the at least one image of the user interacting with the graphical representation of the output of the executing software to identify user interactions with the graphical representation at a client device or remote from a client device displaying the graphical representation. For example, computer vision can be applied at a remote server to the at least one image of the user interacting with the graphical representation in order to identify user interactions with the graphical representation of the output of the executing software. In another example, computer vision can be applied to the at least one image by at least a portion of an applicable system implemented at least in part at a client device to identify user interactions with the graphical representation of the output of the executing software locally at the client device.

The flowchart 200 continues to module 208, where a computer vision-based testing package is generated utilizing the user interactions with the graphical representation of the output of the executing software. An applicable system for applying computer vision to generate data used in functionally testing software, such as the functional testing computer vision systems described in this paper, can generate a computer vision-based testing package utilizing the user interactions with the graphical representation of the output of the executing software. In utilizing the interactions with the graphical representation of the output of the executing software to generate data used in functionally testing software, a script package including script can be generated based on user interactions with the graphical representation of the output of the executing software. For example, if a user activates a graphical icon and a window appears as a result of the user activating the icon, then a script package can be created including script to cause the window to appear when the icon is activated. Additionally, a computer vision-based testing package can be created based on input received from the user. For example, a computer vision-based testing package can be created using code for the software included as part of input received from the user. In another example, a computer vision-based testing package can be created using a test harness included as part of input received from the user. In yet another example, a computer vision-based testing package can be created using testing input determined from input provided by the user.

The flowchart 200 continues to module 210, where the software is functionally tested on at least one virtualized testbed machine using the computer vision-based testing package. An applicable system for managing functional testing of software on a testbed machine, such as the computer vision-based functional testbed systems described in this paper, can functionally test the software on at least one virtualized testbed machine using the computer vision-based testing package. In functionally testing the software on at least one virtualized testbed machine using the computer vision-based testing package, the at least one virtualized testbed machine can be configured to operate according to specific testbed machine characteristics. For example, at least one virtualized testbed machine can be configured to operate as specific device with a specific operating system. In functionally testing the software on at least one virtualized testbed machine using the computer vision-based testing package, script included in the package can be executed according to testing input also included as part of the testing package. Further, in functionally testing the software on the at least one virtualized testbed machine, functional testing analysis can be performed on the output of functionally testing the software in order to generate functional testing results.

Figure 3:
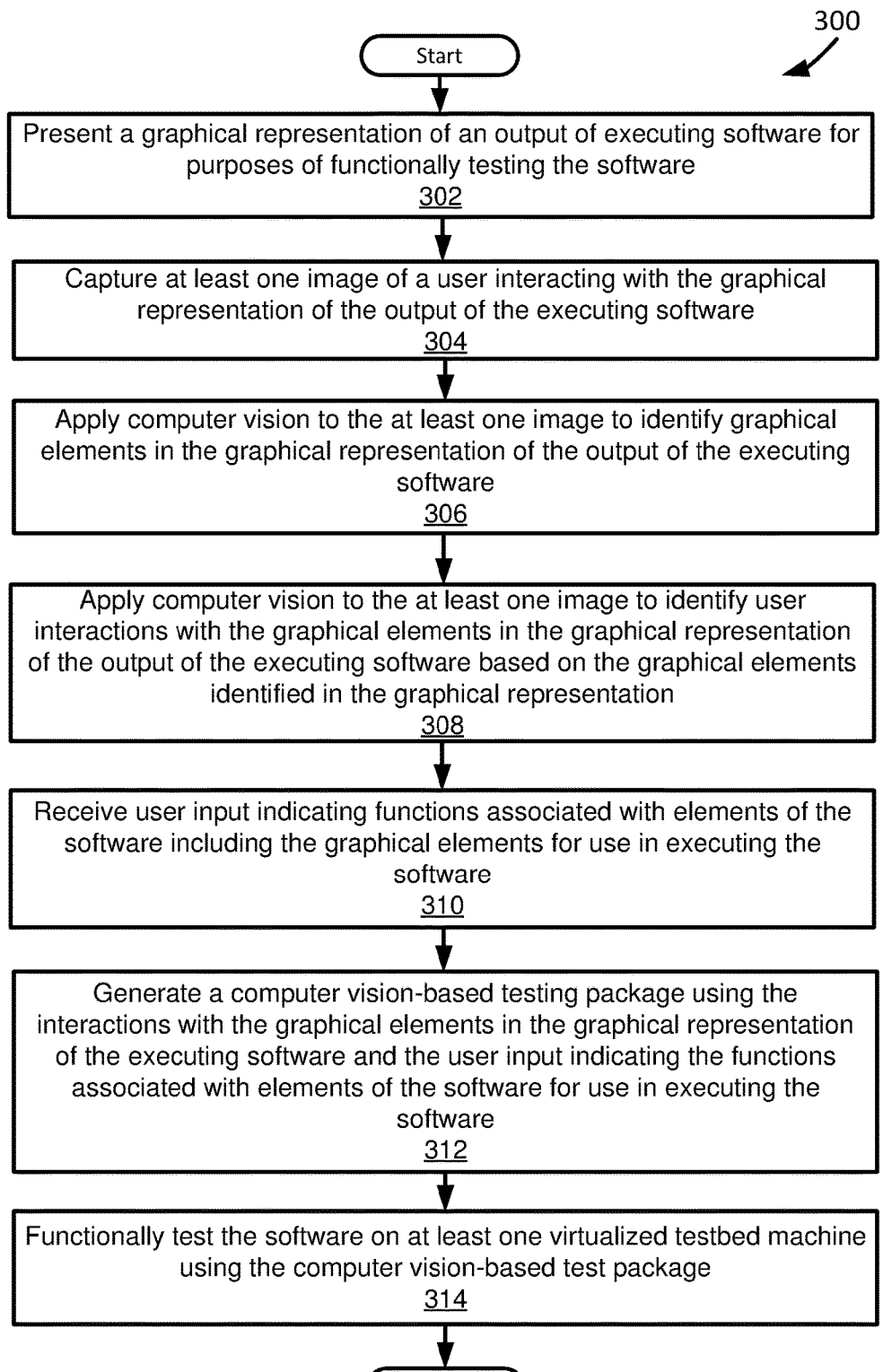
FIG. 3 depicts a flowchart of another example of a method for functionally testing software using computer vision.

FIG. 3 depicts a flowchart 300 of another example of a method for functionally testing software using computer vision. The flowchart 300 begins at module 302, where a graphical representation of an output of executing software is presented to a user for purposes of functionally testing the software. An applicable device, such as the client devices described in this paper, can be used to present to a user a graphical representation of an output of executing software for purposes of functionally testing the software. In presenting to a user a graphical representation of an output of executing software, an abstraction of software can be presented to a user. For example, a mockup of a website can be presented to a user that a user can interact with for purposes of functionally testing the software.

The flowchart 300 continues to module 304, where at least one image of the user interacting with the graphical representation of the output of the executing software is captured. An applicable system for capturing user interaction with a graphical representation of the output of executing software, such as the event capture systems described in this paper, can capture at least one image of the user interacting with the graphical representation of the output of the executing software. For example, a camera positioned to have a view of the graphical representation of the output of executing software can capture at least one image of the user interacting with the graphical representation of the output of the executing software. In another example, a screen capture application, integrated as part of a client device, can capture at least one image of the user interacting with the graphical representation of the output of the executing software through a display integrated as part of the client device.

The flowchart 300 continues to module 306, where computer vision is applied to the at least one image to identify graphical elements in the graphical representation of the output of the executing software. An applicable system for applying computer vision to generate data used in functionally testing software, such as the functional testing computer vision systems described in this paper, can apply computer vision to the at least one image of the user interacting with the graphical representation of the output of the executing software to identify graphical elements in the graphical representation of the output of the executing software. For example, computer vision can be applied to identify graphical icons capable of being activated in the graphical representation of the output of the executing software. Additionally, computer vision can be applied to the graphical representation to identify functions associated with graphical elements. For example, computer vision can be applied to identify a webpage that appears when an icon in another webpage is activated in the graphical representation of the output of the executing software.

The flowchart 300 continues to module 308, where computer vision is applied to the at least one image to identify user interactions with the graphical elements in the graphical representation of the output of the executing software based on the graphical elements identified in the graphical representation. An applicable system for applying computer vision to generate data used in functionally testing software, such as the functional testing computer vision systems described in this paper, can apply computer vision to the at least one image of the user interacting with the graphical representation of the output of the executing software to identify the user interactions with the graphical representation of the output of the executing software. For example, computer vision can be applied to determine elements a user activates in interacting with the graphical representation of the output of the executing software. Further in the example, computer vision can be applied to determine changes to the graphical representation of the output of the executing software in response to the user interacting with the graphical representation of the output the executing software.

The flowchart 300 continues to module 310, where user input indicating functions associated with elements of the software including the graphical elements for use in executing the software is received. An applicable system for applying computer vision to generate data used in functionally testing software, such as the functional testing computer vision systems described in this paper, can receive user input indicating functions associated with elements for use in executing the software. For example, a user can input how to execute the software if a user activates one of the graphical elements in the graphical representation of the output of the executing software. In another example, a user can input how to execute the software if a user speaks a specific phrase or performs a specific action in interacting with the software.

The flowchart 300 continues to module 312, where a computer vision-based testing package is generated using the user interactions with the graphical elements and the user input indicating the functions associated with elements of the software for use in executing the software. An applicable system for applying computer vision to generate data used in functionally testing software, such as the functional testing computer vision systems described in this paper, can generate a computer vision-based testing package using the user interactions with the graphical elements and the user input indicating the functions associated with elements of the software for use in executing the software. For example, a computer vision-based testing package can be created including testing input to use in functionally testing the software, as determined from the user interactions with the graphical elements in the graphical representation of the output of the executing software. In another example, a computer vision-based testing package can be created including functions of the software to execute according to the testing input based on the input received from the user regarding functions associated with the elements of the software for use in executing the software.

In a specific implementation, a script package is created in generating a computer vision-based testing package using the user interactions with the graphical elements and the user input indicating the functions associated with the elements of the software for use in executing the software. A script package can be created to include testing input for use in functionally testing the software. For example, a script package can include testing input generated based on the user interactions with the graphical elements in the graphical representation of the output of the executing software. Additionally, script for use in executing the software for purposes of functionally testing the software can be included in a script package. For example, script in a script package can be created based on the received user input indicating functions associated with elements of the software for use in executing the software.

The flowchart 300 continues to module 314, where the software is functionally tested on at least one virtualized testbed machine using the computer vision-based testing package. An applicable system for managing functional testing of software on at least one virtualized testbed machine, such as the computer vision-based functional testbed systems described in this paper, can functionally test the software on at least one virtualized testbed machine using the computer vision-based testing package. In functionally testing the software using the computer vision-based testing package, script or code included as part of the package can be executed on the at least one virtualized testbed machine according to testing input included as part of the package.

Figure 4:
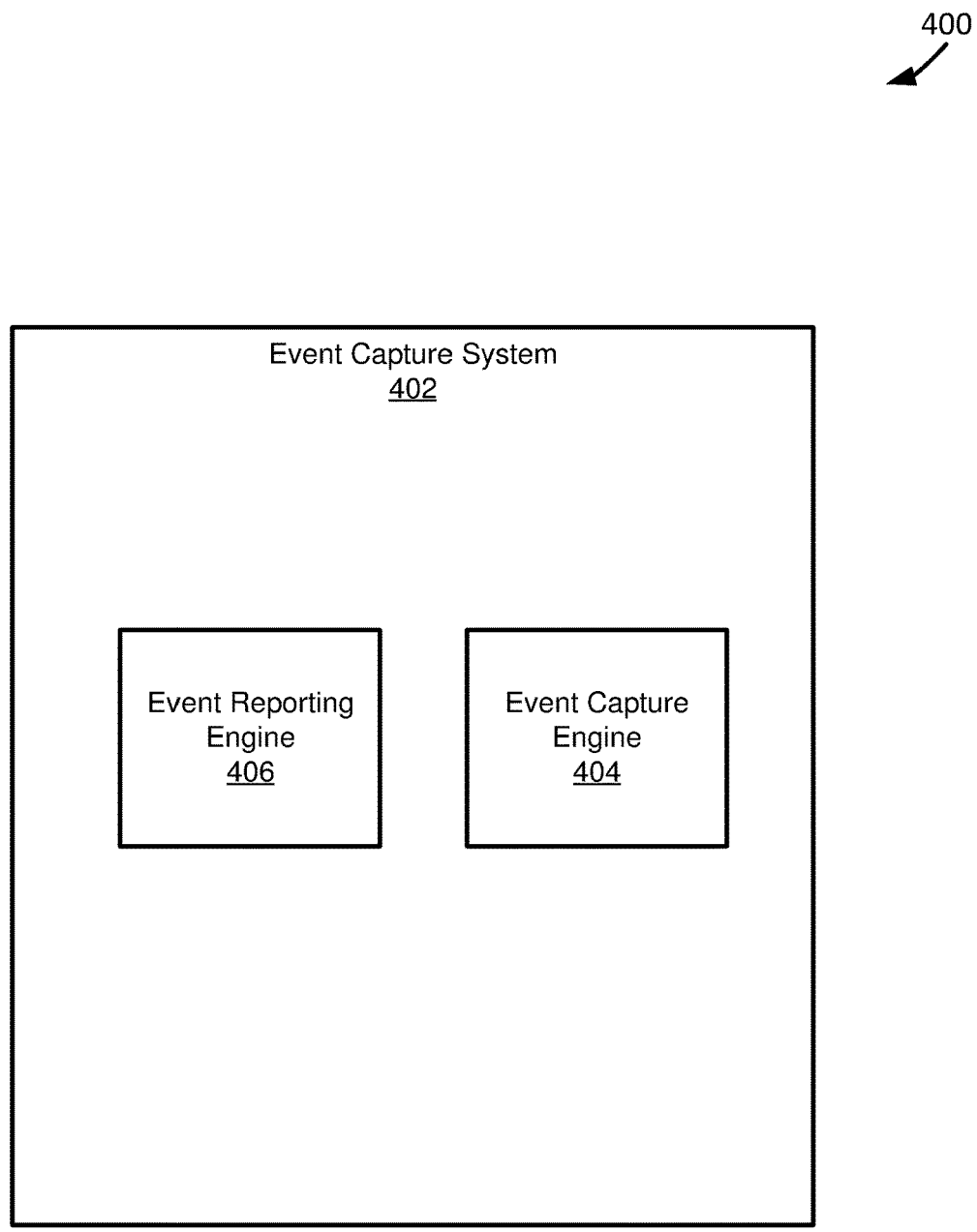
FIG. 4 depicts a diagram of an example of an event capture system.

FIG. 4 depicts a diagram 400 of an example of an event capture system 402. The event capture system 402 is intended to represent an applicable system that functions to capture user interactions for purposes of functionally testing software, such as the event capture systems described in this paper. In capturing events for purposes of functionally testing software, the event capture system 402 can capture images of a user interacting with a graphical display. Specifically, the event capture system 402 can capture images of a user interacting with a graphical representation of either or both an output of executing software and an abstraction of software. For example, the event capture system 402 can capture images of a user interacting with a graphical representation of a mockup of a website. The event capture system 402 can either or both be implemented at a client device with a graphical display or separate from a client device with a graphical display. For example, the event capture system 402 can be implemented in part as a camera with a view of a user interacting with a graphical display of a client device. In another example, the event capture system 402 can be implemented as part of a screen capture application at a client device and configured to capture user interactions with a graphical display at the client device.

The event capture system 402 shown in FIG. 4 includes an event capture engine 404 and an event reporting engine 406. In the example event capture system 402 shown in FIG. 4, the event capture engine 404 is intended to represent an engine that functions to capture user interactions for purposes of functionally testing software. The event capture engine 404 can capture user interactions with a graphical display for purposes of functionally testing software. For example, the event capture engine 404 can capture a user activating a graphical element in a graphical representation of executing software. In another example, the event capture engine 404 can capture a user activating a link in a mockup of a website presented to the user through a graphical display. Additionally, the event capture engine 404 can capture movements made by a user or words spoken by the user. For example, the event capture engine 404 can be integrated as part of microphone and configured to capture an auditory command a user utters when viewing a graphical display, for purposes of functionally testing software.

In a specific implementation, the event capture engine 404 functions to generate event data representing captured events. In generating event data, the event capture engine 404 can generate images included as part of event data. For example, the event capture engine 404 can generate images showing user interactions with a graphical representation of output of executing software, e.g. graphical elements in the graphical representation activated by the user. In another example, the event capture engine 404 can generate images showing gestures made by a user, for example in viewing a graphical representation of output of executing software. Additionally, in generating event data, the event capture engine 404 can generate audio data included as part of event data. For example, the event capture engine 404 can generate event data including an audio recording of auditory commands a user utters when interacting with a graphical representation of output of executing software.

In the example event capture system 402 shown in FIG. 4, the event reporting engine 406 is intended to represent an engine that functions to provide data representing user interactions for use in functionally testing software. The event reporting engine 406 can provide data representing user interactions to an applicable system for generating data use in functionally testing software using computer vision, such as the functional testing computer vision systems described in this paper. The event capture system 402 can provide data representing user interactions to a remote system. For example, the event capture system 402 can provide event data including images of a user interacting with a graphical representation of an output of executing software for purposes of functionally testing the software to a remote system from the event capture system 402. Further in the example, at the remote system, the images of a user interacting with a graphical representation of the output of the executing software can be used to generate a computer vision-based testing package for use in functionally testing the software.

In an example of operation of the example event capture system 402 shown in FIG. 4, the event capture engine 404 generates event data indicating user interactions with a graphical representation of an output of executing software. In the example of operation of the example system shown in FIG. 4, the event reporting engine 406 provides the event data to an applicable system for use in generating data used in functionally testing the software.

Figure 5:
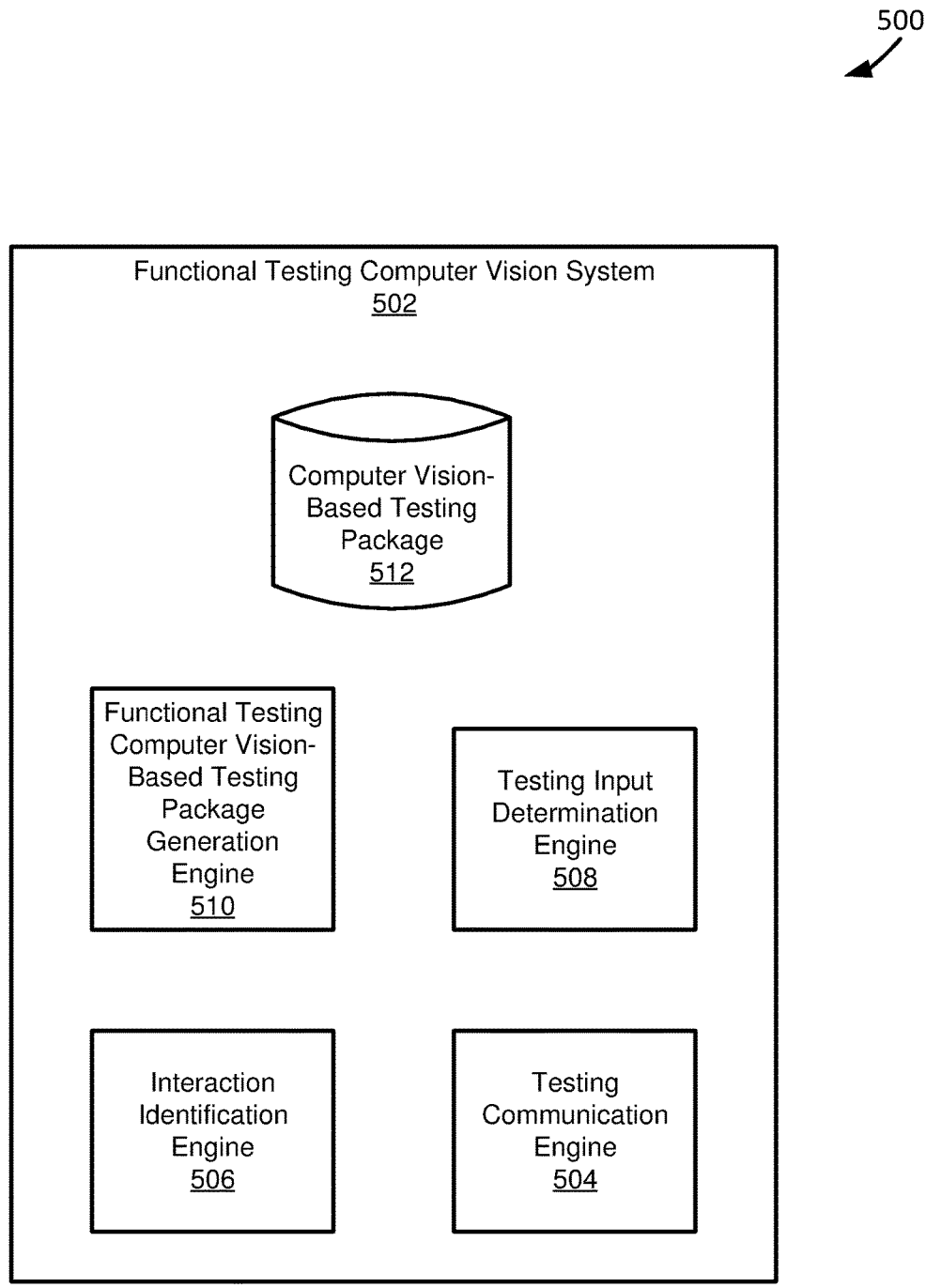
FIG. 5 depicts a diagram of an example of a functional testing computer vision system.

FIG. 5 depicts a diagram 500 of an example of a functional testing computer vision system 502. The functional testing computer vision system 502 is intended to represent an applicable system that functions to generate data used in functionally testing software, such as the functional testing computer vision systems described in this paper. In generating data used in functionally testing software, the functional testing computer vision system 502 can generate a computer vision-based testing package for use in functionally testing software. For example, the functional testing computer vision system 502 can generate a computer vision-based testing package including testing input for controlling functional testing of software and code to execute in functionally testing the software. Further, in generating data used in functionally testing software, the functional testing computer vision system 502 can generate a computer vision-based testing package that is a script package. For example, the functional testing computer vision system 502 can generate a script package including testing input to control functional testing of software and script to execute in functionally testing the software. Further in the example, the functional testing computer vision system 502 can generate the script based on either or both event data indicating user interactions with a graphical representation of output of executing software and input received from the user.

In a specific implementation, the functional testing computer vision system 502 functions to use computer vision to generate data used for functionally testing software. In using computer vision to generate data used for functionally testing software, the functional testing computer vision system 502 can apply computer vision to received event data. For example, the functional testing computer vision system 502 can apply computer vision to event data to identify graphical elements in a graphical representation of an output of executing software which can subsequently be used to generate a computer vision-based testing package for the software. In another example, the functional testing computer vision system 502 can apply computer vision to event data to identify user interactions with a graphical representation of an output of executing software which can subsequently be used to generate a computer vision-based testing package for the software.

In a specific implementation, the functional testing computer vision system 502 functions to use input received from a user to generate data used for functionally testing software. The functional testing computer vision system 502 can utilize user input including code to software to generate a computer vision-based testing package for use in functionally testing the software. For example, the functional testing computer vision system 502 can include code to execute in functionally testing software according to testing inputs in a computer vision-based testing package for the software. Additionally, the functional testing computer vision system 502 can utilize user input indicating functions associated with code or elements of software to generate a computer vision-based testing package for use in functionally testing the software. For example, if user input indicates a function in execution of software associated with activation of a graphical element, then the functional testing computer vision system 502 can generate script to include in a script package that when executed performs the function indicated by the user input.

The example functional testing computer vision system 502 shown in FIG. 5 includes a testing communication engine 504, a user interaction identification engine 506, a testing input determination engine 508, a functional testing computer vision-based testing package generation engine and a computer vision-based testing package datastore 512. The testing communication engine 504 is intended to represent an engine that functions to send and receive data used in functionally testing software using computer vision. The testing communication engine 504 can receive event data from an applicable system for generating event data for use in functionally testing software, such as the event capture systems described in this paper. For example, the testing communication engine 504 can receive images, as part of event data, of a user interacting with a graphical representation of output of executing software. Additionally, the testing communication engine 504 can receive user input regarding functionally testing software. For example, the testing communication engine 504 can receive portions of code of software, for use in executing the software as part of functionally testing the software. In another example, the testing communication engine 504 can receive user input indicating functions in executing software associated with graphical elements and code. In yet another example, the testing communication engine 504 can receive from a user a test harness for use in creating data to use in functionally testing software.

In a specific implementation, the testing communication engine 504 functions to provide data for use in functionally testing software. For example, the testing communication engine 504 can provide a computer vision-based testing package associated with software for use in functionally testing the software. In another example, the testing communication engine 504 can provide a script package created for functionally testing software. The testing communication engine 504 can provide data used in functionally testing software to an applicable system for managing functional testing of software on a testbed machine, such as the computer vision-based functional testbed systems described in this paper.

In a specific implementation, the testing communication engine 504 functions to receive a modified computer vision-based testing package. The testing communication engine 504 can receive a modified computer vision-based testing package from either or both an applicable system for managing functional testing of software on a testbed machine, such as the computer vision-based functional testbed systems described in this paper, or a user. For example, an applicable system for managing functional testing of software can provide a modified computer vision-based testing package modified during the functional testing of software. In another example, a user can resubmit a modified computer vision-based testing package modified during functional testing of software. The testing communication engine 504 can provide a modified computer vision-based testing package to an applicable system for managing functional testing of software on a testbed machine, such as the computer vision-based functional testbed systems described in this paper.

In the example functional testing computer vision system 502 shown in FIG. 5, the user interaction identification engine 506 is intended to represent an engine that functions to determine user interactions for use in controlling functional testing of software. The user interaction identification engine 506 can determine user interactions with a graphical representation of output of executing software. For example, the user interaction identification engine 506 can determine graphical elements a user activates in interacting with a graphical representation of output of executing software. In another example, the user interaction identification engine 506 can determine user interactions with a mockup of a website. The user interaction identification engine 506 can determine user interactions based on received event data. For example, the user interaction identification engine 506 can determine a user activated a specific graphical element in interacting with a graphical representation of output of executing software through received event data. In another example, the user interaction identification engine 506 can identify user interactions including auditory commands a user utters based on received event data.

In a specific implementation, the user interaction identification engine 506 functions to utilize computer vision in determining user interactions. For example, the user interaction identification engine 506 can identify graphical elements in a display of a graphical representation of output of executing software using computer vision. Further in the example, the user interaction identification engine 506 can identify user interactions including interactions with the graphical elements in the display of the graphical representation of the output of the executing software using computer vision. The user interaction identification engine 506 can apply computer vision to received event data to determine user interactions. For example, the user interaction identification engine 506 can apply computer vision to images of a user interacting with a graphical representation of an output of executing software to determine graphical elements the user activates in interacting with the graphical representation.

The testing input determination engine 508 in the example functional testing computer vision system 502 shown in FIG. 5 is intended to represent an engine that functions to determine testing input for use in controlling functional testing of software using computer vision. The testing input determination engine 508 can determine testing input based on user interactions determined from an applicable engine for determining user interactions, such as the user interaction identification engines described in this paper. For example, if user interactions indicate a user activated a specific graphical element, then the testing input determination engine 508 can determine testing input to include activating the specific graphic element in functionally testing the software based on the user interactions. In another example, if user interactions indicates a user utters an auditory command for software to function a specific way, then the testing input determination engine 508 can generate testing input to include executing the software in the specific way, as part of functionally testing the software.

In a specific implementation, the testing input determination engine 508 functions to generate testing input based on input received from a user. For example, if user input indicates a user wants to functionally test software by performing specific functions, then the testing input determination engine 508 can generate testing input indicating the specific functions to perform in functionally testing the software. In generating testing input based on user input, the testing input determination engine 508 can generate testing input from a test harness provided by the user as part of user input. For example, if a test harness indicates specific functions to perform in executing software as part of functionally testing the software, then the testing input determination engine 508 can generate testing input indicating to perform the specific functions.

In the example functional testing computer vision system 502 shown in FIG. 5, the functional testing computer vision-based testing package generation engine 510 is intended to represent an engine that functions to generate data used in functionally testing software. In generating data use in functionally testing software, the functional testing computer vision-based testing package generation engine 510 can generate a computer vision-based testing package for use in functionally testing software. The functional testing computer vision-based testing package generation engine 510 can generate a computer vision-based testing package can generate a computer vision-based testing package based on either or both identified user interactions and determined testing input. For example, if testing input indicates to execute specific code in functionally testing software, then the functional testing computer vision-based testing package generation engine 510 can generate a computer vision-based testing package including the testing input indicating to execute the specific code. In another example, if user interaction indicate a user made an auditory command to perform a specific function of the software, then the functional testing computer vision-based testing package generation engine 510 can generate a computer vision-based testing package with input indicating to perform the specific function in functionally testing the software.

In a specific implementation, the functional testing computer vision-based testing package generation engine 510 functions to generate data used in functionally testing software based on received user input. In utilizing user input to generate data used in functionally testing software, the functional testing computer vision-based testing package generation engine 510 can use code of software provided as part of user input. For example, the functional testing computer vision-based testing package generation engine 510 can include provided code for performing functions in functionally testing software, as part of a computer vision-based testing package. Further, in utilizing user input to generate data used in functionally testing software, the functional testing computer vision-based testing package generation engine 510 can utilize a test harness, provided as user input. For example, if a user provides a test harness including testing constraints, then the functional testing computer vision-based testing package generation engine 510 can generate a computer vision-based testing package including the testing constraints, according to the test harness.

In a specific implementation, the functional testing computer vision-based testing package generation engine 510 functions to generate a script package as part of a computer vision-based testing package for use in functionally testing software. In generating a script package as part of a computer vision-based testing package, the functional testing computer vision-based testing package generation engine 510 can generate script to execute in functionally testing software. The functional testing computer vision-based testing package generation engine 510 can generate script included as part of a script package according to one or an applicable combination of identified user interactions, received user input, and determined testing input. For example, if user interactions indicate a user activated a specific graphical element in a graphical representation of output of executing software, then the functional testing computer vision-based testing package generation engine 510 can generate script associated with, or otherwise causing, activation of the graphical element when the software is functional testing. In another example, if user input indicates functions associated with activation in a graphical element of a graphical representation of output of executing software, then the functional testing computer vision-based testing package generation engine 510 can generate script to cause the specific functions to be performed in functionally testing the software.

In a specific implementation, the functional testing computer vision-based testing package generation engine 510 functions to use computer vision to generate data used in functionally testing software. The functional testing computer vision-based testing package generation engine 510 can use computer vision to generate a computer vision-based testing package and a script package. For example, the functional testing computer vision-based testing package generation engine 510 can use computer vision to determine changes to a graphical representation of output of executing software as the user interacts with the graphical representation of the output. Further in the example, the functional testing computer vision-based testing package generation engine 510 can generate script to include in a script package based on the changes to the graphical representation determined using computer vision.

In the example functional testing computer vision system 502 shown in FIG. 5, the computer vision-based testing package datastore 512 is intended to representation a datastore that functions to store computer vision-based testing package data. Computer vision-based testing package data includes computer vision-based testing packages and script packages used in functionally testing software. Computer vision-based testing package data stored in the computer vision-based testing package datastore 512 can be generated by an applicable engine for generating data used in functionally testing software, such as the functional testing computer vision-based testing package generation engines described in this paper. Additionally, computer vision-based testing package data stored in the computer vision-based testing package datastore 512 can include a modified computer vision-based testing package, e.g. modified through functional testing of software.

In an example of operation of the example functional testing computer vision system 502 shown in FIG. 5, the testing communication engine 504 receives event data including at least one image of a user interacting with a graphical representation of output of executing software. In the example of operation of the example system shown in FIG. 5, the user interaction identification engine 506 determines user interactions with the graphical representation of the output of the executing software by applying computer vision to the at least one image of the user interacting with the graphical representation of the output of the executing software. Further, in the example of operation of the example system shown in FIG. 5, the testing input determination engine 508 determines testing input for use in controlling functional testing of the software based on the determined user interactions with the graphical representation of the output of the executing software. In the example of operation of the example system shown in FIG. 5, the functional testing computer vision-based testing package generation engine 510 uses computer vision and the determined testing input to generate a computer vision-based testing package for use in functionally testing the software. Additionally, in the example of operation of the example system shown in FIG. 5, the computer vision-based testing package datastore 512 stores computer vision-based testing package data indicating the computer vision-based testing package generated by the functional testing computer vision-based testing package generation engine 510. In the example of operation of the example system shown in FIG. 5, the testing communication engine 504 provides the computer vision-based testing package data indicating the computer vision-based testing package generated by the functional testing computer vision-based testing package generation engine 510 to an applicable system for managing functional testing of software on a testbed machine, such as the computer vision-based functional testbed systems described in this paper.

Figure 6:
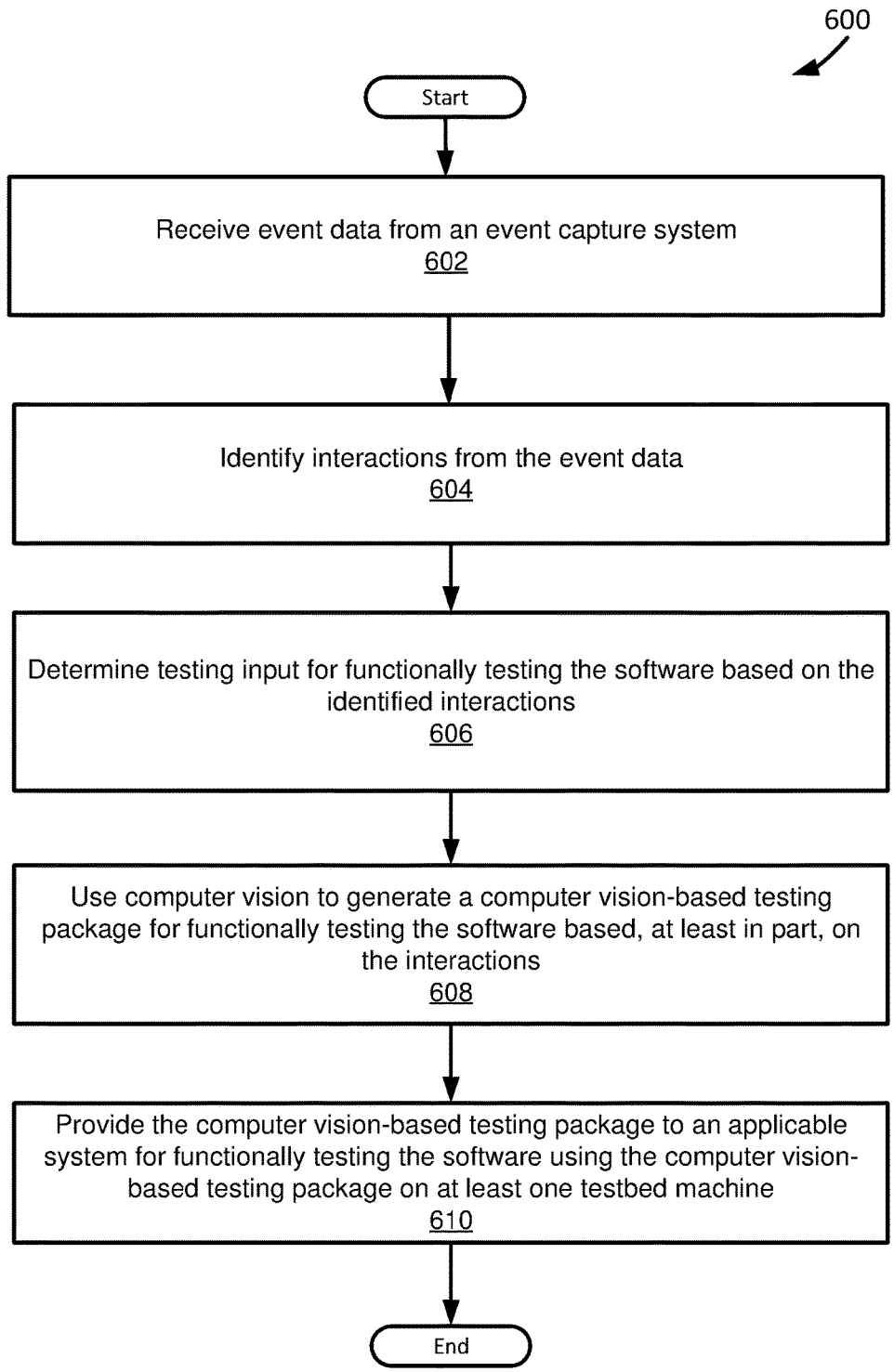
FIG. 6 depicts a flowchart of an example of a method for generating data used in functionally testing software using computer vision.

FIG. 6 depicts a flowchart 600 of an example of a method for generating data used in functionally testing software using computer vision. The flowchart 600 begins at module 602, where event data of a user is received from an event capture system. An applicable system for communicating for purposes of functionally testing software using computer vision, such as the testing communication engines described in this paper, can receive event data of a user fro, an event capture system. Received event data can include at least one image of a user interacting with either or both a graphical representation of an abstraction of software to be functionally tested and of an output of executing software to be functionally tested. For example, event data can include at least one image of a user interacting with a mockup of a website to be functionally tested. In another example, event data can include at least one image of a user activating graphical elements in a graphical representation of an output of executing software under functional testing.

The flowchart 600 continues to module 604, where user interactions of the user are identified from the event data. An applicable engine for determining user interactions of a user for purposes of functionally testing software, such as the user identification engines described in this paper, can determine user interactions of the user from the event data. User interactions of the user with a graphical interface can be determined by applying computer vision to the event data. For example, user interactions of a user with a graphical representation of an output of executing software can be determined by applying computer vision to the event data. In another example, user interactions of a user with a graphical representation of an abstraction of software can be determined by applying computer vision to the event data. Additionally, user interactions including auditory commands uttered by a user can be determined from the event data.

The flowchart 600 continues to module 606, where testing input for functionally testing the software is determined based on the identified user interactions. An applicable engine for determining testing input for use in functionally testing the software, such as the testing input determination engines described in this paper, can determine testing input for functionally testing the software based on the user interactions. In determining testing input for functionally testing the software, the testing input can be generated to cause the software to execute based on the user interactions as part of functionally testing the software. For example, if a user activates a graphical element in interacting with software, then testing input can be generated to cause the software to execute as if the user activates the graphical element as part of functionally testing the software. In another example, if a user utters a vocal command to cause the software to perform a specific function, then testing input can be generated to cause the software to execute in performing the specific function as part of functionally testing the software.

The flowchart 600 continues to module 608, where computer vision is used to generate a computer vision-based testing package for functionally testing the software, based at least in part, on the user interactions. An applicable engine for generating data used in functionally testing software, such as the functional testing computer vision-based testing package generation engines described in this paper, can generate data used in functionally testing the software, based at least in part, on the user interactions. A computer vision-based testing package for functionally testing the software can be generated based on the determined testing input. For example, a computer vision-based testing package can be generated to include the determined testing input for use in controlling execution of the software as part of functionally testing the software. Additionally, in using computer vision to generate a computer vision-based testing package, computer vision can be applied to determine changes in a graphical representation of output of executing software for purposes of generated a computer vision-based testing package. For example, computer vision can be applied to changes in a graphical representation of output of executing software to generate script for use in executing the software as part of functionally testing the software.

The flowchart 600 continues to module 610, where the computer vision-based testing package is provided to an applicable system for functionally testing the software using the computer vision-based testing package on at least one testbed machine. An applicable engine for communicating for purposes of functionally testing software using computer vision, such as the testing communication engines described in this paper, can provide the computer vision-based testing package to an applicable system for functionally testing the software using the computer vision-based testing package. An applicable system for functionally testing software using a computer vision-based testing package, such as the computer vision-based functional testbed systems described in this paper, can receive the computer vision-based testing package for use in functionally testing the software on at least one testbed machine using the package.

Figure 7:
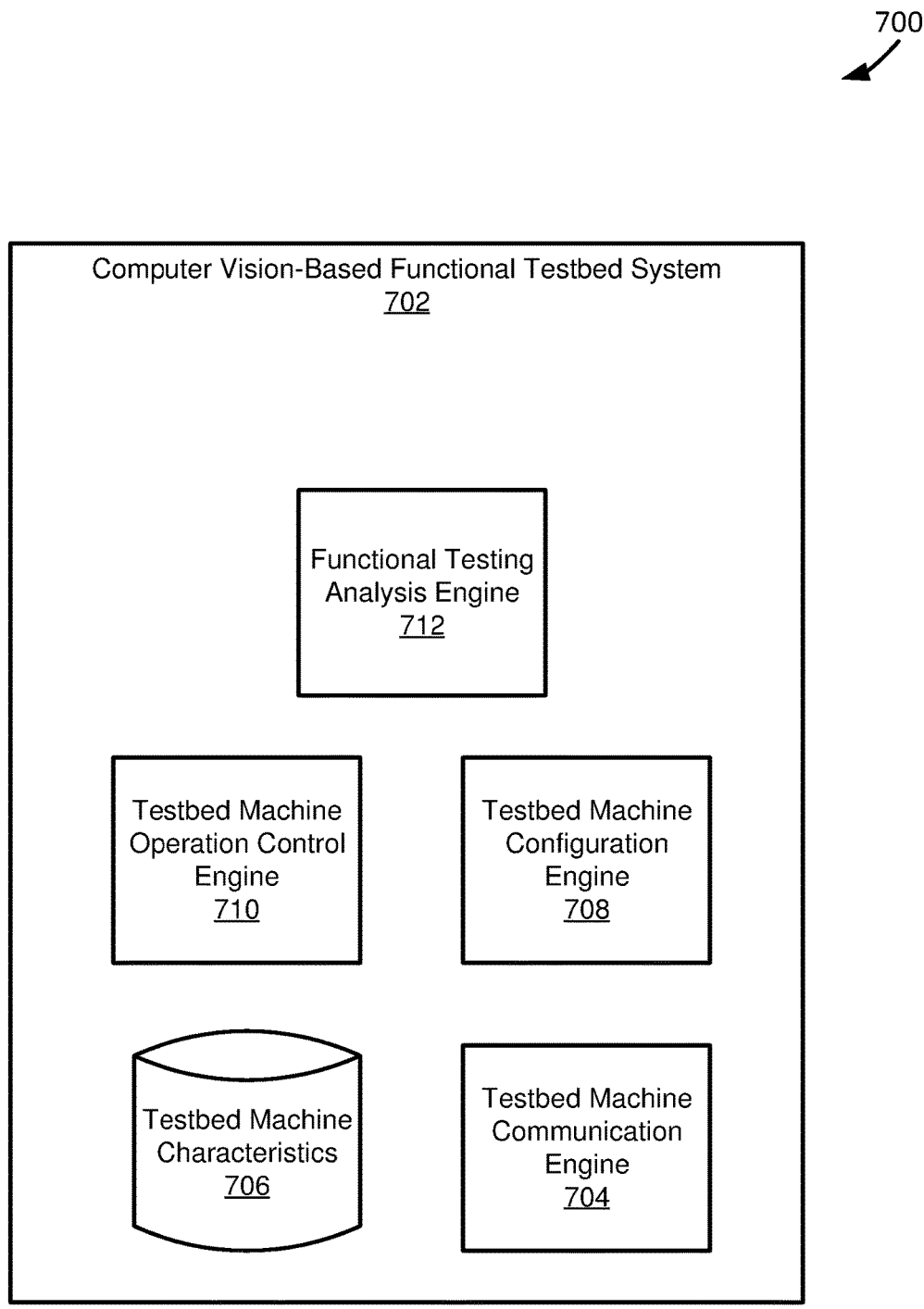
FIG. 7 depicts a diagram of an example computer vision-based functional testbed system.

FIG. 7 depicts a diagram 700 of an example computer vision-based functional testbed system 702. The computer vision-based functional testbed system 702 is intended to represent a system that functions to manage functional testing of software on a testbed machine using computer vision, such as the computer vision-based functional testbed systems described in this paper. In managing functional testing of software on a testbed system based on computer vision, the computer vision-based functional testbed system 702 can receive data used in functionally testing software. For example, the computer vision-based functional testbed system 702 can receive a computer vision-based testing package for use in functionally testing software. In another example, the computer vision-based functional testbed system 702 can receive a script package including script used in functionally testing software on at least one machine. The computer vision-based functional testbed system 702 can receive data used in functionally testing software from an applicable system for generating data used in testing software using computer vision, such as the functional testing computer vision systems described in this paper.

In a specific implementation, in managing functional testing of software on a testbed machine, the computer vision-based functional testbed system 702 functions to determine and subsequently provide functional testing results to a user. For example, the computer vision-based functional testbed system 702 can generate functional testing results indicating software has been functionally tested. The computer vision-based functional testbed system 702 can perform functional testing analysis to generate functional analytics data to include as part of functional testing results. For example, the computer vision-based functional testbed system 702 can generate functional analytics data indicating areas in a graphical representation of output of software that change past a certain threshold degree in functionally testing the software. The computer vision-based functional testbed system 702 can use an output of functionally tested software to generate functional testing results.

In a specific implementation, the computer vision-based functional testbed system 702 functions to use computer vision to generate functional testing results. Specifically, the computer vision-based functional testbed system 702 can apply computer vision to an output of functionally tested software to determine an area in a graphical representation of the output that change based on either or both a frequency and a degree to which the areas change in the graphical representation. For example, if an area in a graphical representation of an output of executing software changes beyond a threshold degree, then the computer vision-based functional testbed system 702 can generate functional testing results highlighting the area in the graphical representation of the output.

In a specific implementation, the computer vision-based functional testbed system 702 functions to set up at least one virtualized testbed machine for purposes of functionally testing software. In setting up at least one virtualized testbed machine for purposes of functionally testing software, the computer vision-based functional testbed system 702 can virtualize the at least one testbed machine according to testbed machine characteristics. For example, if testbed machine characteristics receive from a user indicate to functionally test software on a specific device, then the computer vision-based functional testbed system 702 can set up a virtual machine to emulate the specific device in functionally testing the software.

The example computer vision-based functional testbed system 702 shown in FIG. 7 includes a testbed machine communication engine 704, a testbed machine characteristics datastore 706, a testbed machine configuration engine 708, a testbed machine operation control engine 710, and a functional testing analysis engine 712. The testbed machine communication engine 704 in the example computer vision-based functional testbed system 702 shown in FIG. 7 is intended to represent an engine that functions to send and receive data used in functionally testing software on at least one testbed machine. The testbed machine communication engine 704 can receive a computer vision-based testing package for use in functionally testing software. For example, the testbed machine communication engine 704 can receive a script package including script used in functionally testing software on at least one testbed machine.

In a specific implementation, the testbed machine communication engine 704 functions to provide functional testing results to a user. In providing functional testing results to a user, the testbed machine communication engine 704 can provide functional analytics data generated through functional testing analysis. For example, the testbed machine communication engine 704 can provide functional analytics data indicating areas in a graphical representation of output of software that change past a certain threshold degree in functionally testing the software. Additionally, the testbed machine communication engine 704 can provide functional analytics data generated using functional testing analysis by applying computer vision to an output of software functionally tested. For example, the testbed machine communication engine 704 can provide functional analytics data indicating graphical elements that change more than a threshold amount in a graphical representation of output of executing software, as determined by applying computer vision to the output.

In a specific implementation, the testbed machine communication engine 704 functions to receive modification input. The testbed machine communication engine 704 can receive modification input including recovery input generated according to recovery strategies for purposes of recovering a flow of execution of software in functionally testing the software on at least one testbed machine. For example, the testbed machine communication engine 704 can receive recovery input indicating modifications to make to code or script for recovering a flow of execution of software in functionally testing the software. Additionally, the testbed machine communication engine 704 can receive a modified computer vision-based testing package for use in functionally testing software. For example, the testbed machine communication engine 704 can receive a computer vision-based testing package modified by the computer vision-based functional testbed system in functionally testing software and re-submitted by a user for continued functional testing of the software.

In a specific implementation, the testbed machine communication engine 704 functions to receive testbed machine characteristics. Testbed machine characteristics received by the testbed machine communication engine 704 can be utilized in configuring a virtualized testbed machine for purposes of functionally testing software. For example, testbed machine characteristics received by the testbed machine communication engine 704 can specify to configure a virtualized testbed machine to operate as an Android® device with a specific screen size, and the virtualized testbed machine can subsequently be configured to operate as an Android® device with the specific screen size. Testbed machine characteristics can be received by the testbed machine communication engine 704 as either or both part of a computer vision-based testing package and input from a user.

The testbed machine characteristics datastore 706 in the example computer vision-based functional testbed system 702 shown in FIG. 7 functions according to an applicable datastore for storing testbed machine characteristics data. Testbed machine characteristics data stored in the testbed machine characteristics datastore 706 can be used to configure a virtualized testbed machine for purposes of functionally testing software. Testbed machine characteristics data stored in the testbed machine characteristics datastore 706 can be received or otherwise determined from data received from an applicable engine for communicating for purposes of functionally testing software on a testbed machine, such as the testbed machine communication engines described in this paper. For example, testbed machine characteristics data stored in the testbed machine characteristics datastore 706 can be determined from either or both received user input and a received computer vision-based testing package.

The testbed machine configuration engine 708 in the example computer vision-based functional testbed system 702 shown in FIG. 7 is intended to represent an engine that functions to configure a virtualized testbed machine for functionally testing software. The testbed machine configuration engine 708 can configure a virtualized testbed machine according to testbed machine characteristics. For example, if user input indicates to functionally test software on an iOS® machine, then the testbed machine configuration engine 708 can configure a virtualized testbed machine to operate using iOS® for purposes of functionally testing the software on the virtualized testbed machine. In configuring a virtualized testbed machine for functionally testing software, the testbed machine configuration engine 708 can configure a plurality of different virtualized testbed machines to functionally test software, potentially simultaneously. For example, the testbed machine configuration engine 708 can configure a first virtualized testbed machine to operate as an iOS® device for functionally testing software, and a second virtualized testbed machine to operate as an Android® device for concurrently functionally testing the software.

The testbed machine operation control engine 710 in the example computer vision-based functional testbed system 702 shown in FIG. 7 is intended to represent an engine that functions to manage functional testing of software on a virtualized testbed machine. The testbed machine operation control engine 710 can use a computer vision-based testing package to generate output in functionally testing software on a virtualized testbed machine. For example, the testbed machine operation control engine 710 can execute code included as part of a computer vision-based testing package on a virtualized testbed machine according to testing input to generate testing output as part of functionally testing software. In another example, the testbed machine operation control engine 710 can execute script included as part of a script package on a virtualized testbed machine according to testing input to generate testing output as part of functionally testing software.

In a specific implementation, the testbed machine operation control engine 710 functions to either or both modify and generate code and script of software as part of functionally testing the software. The testbed machine operation control engine 710 can modify or generate code and script of software based on results of functionally testing software. For example, if in functionally testing software a function of the software fails, then the testbed machine operation control engine 710 can modify code of the software in order to correct the function of the software. In another example, the testbed machine operation control engine 710 can generate code in functionally testing software according to testing input. In modifying and generating code and script of software as part of functionally testing the software, the testbed machine operation control engine 710 can modify a computer vision-based testing package used in functionally testing the software. For example, the testbed machine operation control engine 710 can modify a script package used in functionally testing software by modifying code used in executing the software and included as part of the script package.

In a specific implementation, the testbed machine operation control engine 710 functions to modify code or script as part of functionally testing software based on received modification input. Modification input can be received from an applicable source, such as a client device or an applicable system for performing automated recovery of a flow of executing software in functionally testing the software, such as the functional flow testing triage systems described in this paper. For example, modification input can include user input indicating modifications to make to code of software in response to problems identified through functional testing of the software. In another example, modification input can include recovery input indicating steps to take, including script modifications to make, in recovering a flow of executing software in functionally testing the software.

The functional testing analysis engine 712 in the example computer vision-based functional testbed system 702 shown in FIG. 7 is intended to represent an engine that functions to manage analysis of functional testing of software on a virtualized testbed machine. In managing analysis of functional testing of software on a virtualized testbed machine, the functional testing analysis engine 712 can generate functional testing results of functionally testing software. For example, the functional testing analysis engine 712 can generate functional testing results indicating problems discovered in functionally testing software on a virtualized testbed machine. In another example, the functional testing analysis engine 712 can generate functional testing results including data used in producing a graphical representation of an output of functionally testing software on a virtualized testbed machine. Further in the another example, the functional testing analysis engine 712 can generate functional testing results including data used in producing a graphical representation of an output of executing either or both code and script in functionally testing software on a virtualized testbed machine.

In a specific implementation, the functional testing analysis engine 712 functions to perform functional testing analysis by comparing an actual output of executing software as part of functionally testing the software to an expected output of executing the software according to testing input. In comparing an actual output to an expected output of executing software, the functional testing analysis engine 712 can compare a graphical representation of the actual output of the executing software to a graphical representation of the expected output of the executing software as part of functionally testing the software. For example, the functional testing analysis engine 712 can compare an element in a graphical representation of an actual output of executing software with an element in a graphical representation of an expected output of executing the software to determine either or both a frequency at which the element changes or a degree to which the element changes, as part of performing functional testing analysis of the software.

In a specific implementation, the functional testing analysis engine 712 functions to perform functional testing analysis of functional testing of software to generate functional testing analytics data. The functional testing analysis engine 712 can perform functional testing analysis by examining output of executing software in response to testing input. In performing functional testing analysis of functional testing of software, the functional testing analysis engine 712 can compare outputs of executing software on the same virtualized testbed machine two different times according to the same testing input. For example, if a dialog box appears when software is executed on a testbed machine a first time and fails to appear when software is executed on the testbed machine a second time, then the functional testing analysis engine 712 can highlight the problem of the dialog box failing to appear, as part of performing functional testing analysis of functional testing of the software. The functional testing analysis engine 712 functions to use computer vision to perform functional testing analysis of software. In using computer vision to perform functional testing analysis of software, the functional testing analysis engine 712 can use computer vision to detect changes in graphical representations of output of software executing as part of functional testing of the software. Specifically, the functional testing analysis engine 712 can use computer vision to detect either or both a frequency and a degree to which elements change in a graphical representation of an output of software executing as part of functionally testing the software.

In a specific implementation, the functional testing analysis engine 712 functions to perform functional testing analysis based on a frequency at which elements change in a graphical representation of output of software executing on a testbed machine as part of functional testing. Specifically, as part of performing functional testing analysis, the functional testing analysis engine 712 can highlight elements that change frequently or fail to change frequently in a graphical representation of output of software executing on the same testbed machine multiple times. Additionally, as part of performing functional testing analysis based on a frequency at which elements change, the functional testing analysis engine 712 can highlight elements that change frequently or infrequently in a graphical representation of output of software executing multiple times on the same testbed machine according to the same testing input.

In a specific implementation, the functional testing analysis engine 712 functions to perform functional testing analysis based on a degree of change of an element in a graphical representation of output of software executing on a testbed machine as part of functional testing of the software. Specifically, as part of performing functional testing analysis, the functional testing analysis engine 712 can highlight elements that change a specific amount in a graphical representation of output of software executing on the same testbed machine multiple times. For example, if an element of a graphical representation of an output of executing software changes in size greater than specific threshold amounts when the software is executed multiple times on a testbed machine, then the functional testing analysis engine 712 can highlight the element. Additionally, as part of performing functional testing analysis based on a degree of change of elements, the functional testing analysis engine 712 can highlight elements in a graphical representation of output of software executing multiple times on the same testbed machine according to the same testing input based on the degree in which the elements change in the graphical representation when the software is executed multiple times.

In an example of operation of the example computer vision-based functional testbed system 702 shown in FIG. 7, the testbed machine communication engine 704 receives a computer vision-based testing package for use in functionally testing software. In the example of operation of the example system shown in FIG. 7, the testbed machine characteristics datastore 706 stores testbed machine characteristics data indicated by the computer vision-based testing package. Further, in the example of operation of the example system shown in FIG. 7, the testbed machine configuration engine 708 configures a virtualized testbed machine according to the testbed machine characteristics data stored in the testbed machine characteristics datastore 706. In the example system shown in FIG. 7, the testbed machine operation control engine 710 manages functional testing of the software on the virtualized testbed machine using the computer vision-based testing package. Additionally, in the example of operation of the example system shown in FIG. 7, the functional testing analysis engine 712 generates functional testing results of functionally testing the software on the virtualized testbed machine. In the example of operation of the example system shown in FIG. 7, the testbed machine communication engine 704 provides the functional testing results to a user through a client device associated with the user.

Figure 8:
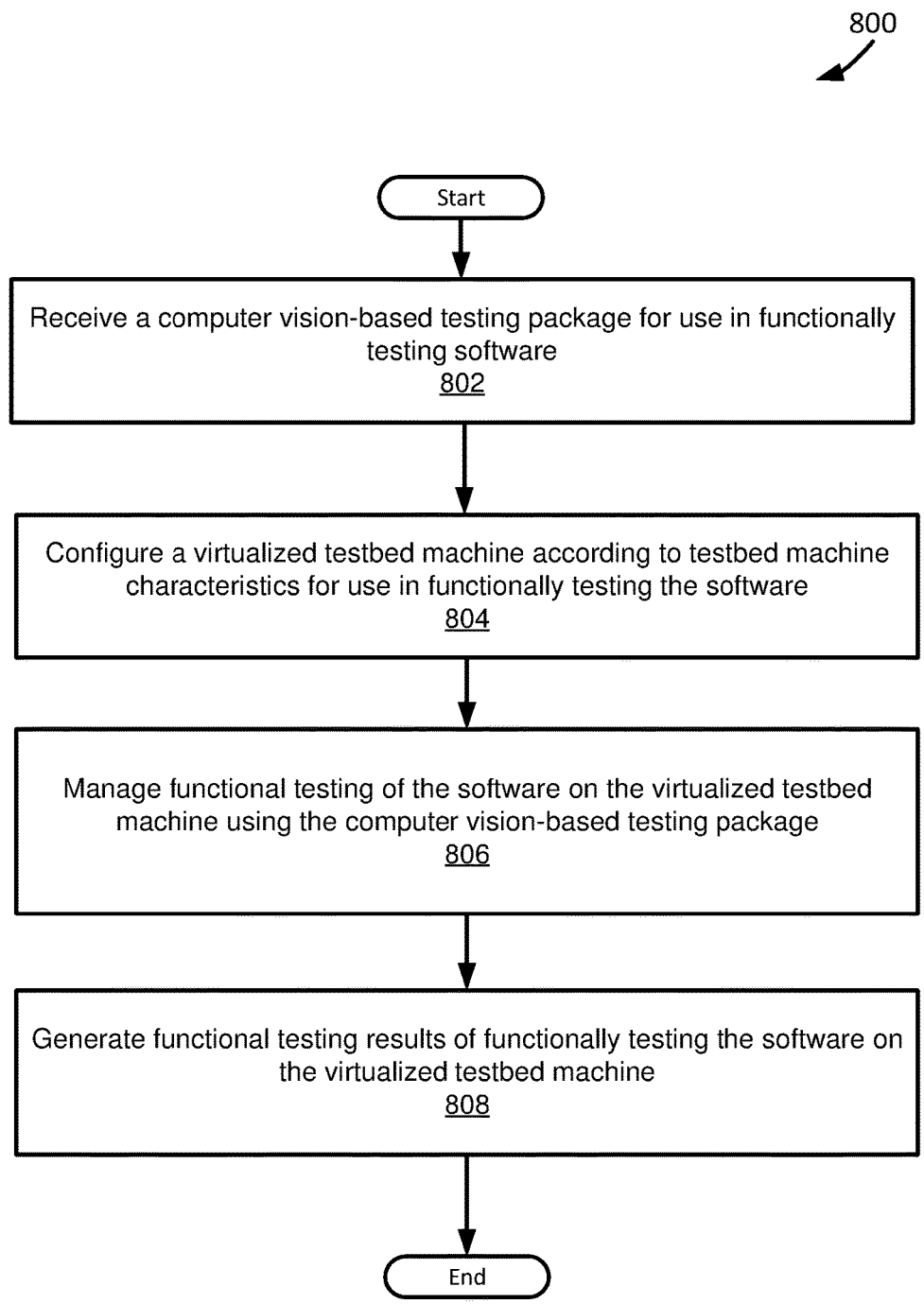
FIG. 8 depicts a flowchart of an example of a method for functionally testing software on a virtualized testbed machine using a computer vision-based testing package.

FIG. 8 depicts a flowchart 800 of an example of a method for functionally testing software on a virtualized testbed machine using a computer vision-based testing package. The flowchart 800 begins at module 802, where a computer vision-based testing package for use in functionally testing software is received. A computer vision-based testing package for use in functionally testing software can be received from an applicable system for generating, through computer vision, data used in functionally testing software, such as the functional testing computer vision systems described in this paper. A computer vision-based testing package for use in functionally testing software can be received by an applicable engine for communicating for purposes of functionally testing software on a virtualized testbed machine, such as the testbed machine communication engines described in this paper. A received computer vision-based testing package can include testing input and script capable of being executed according to the testing input for purposes of functionally testing the software.

The flowchart 800 continues to module 804, where a virtualized testbed machine is configured according to testbed machine characteristics for use in functionally testing the software. An applicable engine for configuring a virtualized testbed machine for functionally testing software, such as the testbed machine configuration engines described in this paper, can configure a virtualized testbed machine according to testbed machine characteristics. A testbed machine can be configured according to testbed machine characteristics indicated by testbed machine characteristics data included in either or both user input and the computer vision-based testing package.

The flowchart 800 continues to module 806, where functional testing of the software on the virtualized testbed machine using the computer vision-based testing package is managed. An applicable engine for managing functional testing of software on a virtualized testbed machine, such as the testbed machine operation control engines described in this paper, can manage functional testing of the software on the virtualized testbed machine using the computer vision-based testing package. In managing functional testing of the software on the virtualized testbed machine, code or script can be executed on the virtualized testbed machine based on testing input to generate output. Further, code or script included in the computer vision-based testing package can be executed on the virtualized testbed machine according to testing input included as part of the testing package.

The flowchart 800 continues to module 808, where functional testing results of functionally testing the software on the virtualized testbed machine are generated. An applicable engine for generating functional testing results of functionally testing software on a virtualized testbed machine, such as the functional testing analysis engines described in this paper, can generate functional testing results of functionally testing the software on the virtualized testbed machine. Functional testing results can be generated by performing functional testing analysis of the functional testing of the software on the virtualized testbed machine. Further, functional testing results can be generated by applying computer vision to an output of functionally testing the software on the virtualized testbed machine.

Figure 9:
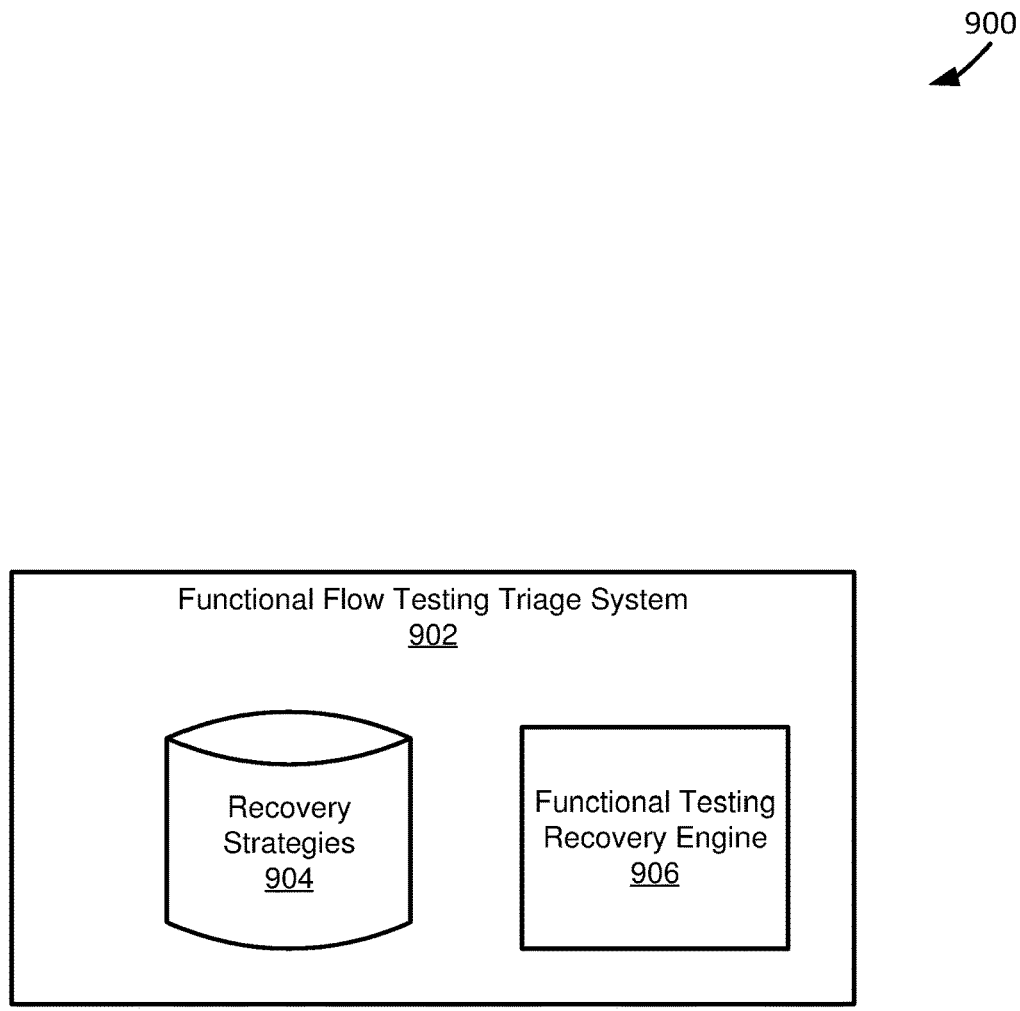
FIG. 9 depicts a diagram of an example of a functional flow testing triage system.

FIG. 9 depicts a diagram 900 of an example of a functional flow testing triage system 902. The example functional flow testing triage system 902 is intended to represent an applicable system that functions to automatically perform recovery of a flow of executing software in functionally testing the software, such as the functional flow testing triage systems described in this paper. The functional flow testing triage system 902 can use an output of software under test in performing automatic recovery of a flow of the executing software. For example, the functional flow testing triage system 902 can compare an actual output of software under test to an expected output to determine steps or remedies to take in automatically recovering a flow of the software executing under test. Additionally, the functional flow testing triage system 902 can automatically perform recovery of a flow of executing software under test according to recovery strategies. Further, in automatically performing recovery of a flow of executing software under test, the functional flow testing triage system 902 can generate and provide recovery input for use in recovering the flow of the executing software under test. For example, the functional flow testing triage system 902 can provide recovery input including either or both modified code or script and instructions for modifying code or script for use in automatically recovering a flow of executing software under test.

The functional flow testing triage system 902 shown in FIG. 9 includes a recovery strategies datastore 904 and a functional testing recovery engine 906. The recovery strategies datastore 904 in the example functional flow testing triage system 902 shown in FIG. 9 is intended to represent a datastore that functions to store recovery strategies data indicating recovery strategies. Recovery strategies data stored in the recovery strategies datastore 904 indicates recovery strategies for use in automatically recovering a flow of software executing under functional testing. For example, recovery strategies data stored in the recovery strategies datastore 904 can indicate script to modify in order to remedy an observed problem or stoppage in a flow of executing software under functional testing. Recovery strategies indicated by recovery strategies data stored in the recovery strategies datastore 904 can be specific to one or a combination of an identification of software under test, a type of software under test, functions being tested as part of software being tested, an expected output of software in testing the software, an actual output of software in testing the software, and differences between an actual and expected output of software in testing the software. For example, recovery strategies data stored in the recovery strategies datastore 904 can indicate that if a specific function is not executing properly in testing software, then specific remedial steps should be taken to recover the flow of executing of the software in testing the software.

The functional testing recovery engine 906 in the example functional flow testing triage system 902 shown in FIG. 9 is intended to represent an engine that functions to automatically perform recovery of a flow of executing software under test. In automatically performing recovery of a flow of executing software under test, the functional testing recovery engine 906 can generate and provide recovery input for us in automatically performing recovery of a flow of executing software under test. For example, the functional testing recovery engine 906 can provide recovery input indicating modifications to make to executing script in order to automatically recover a flow of the executing script of software under functional testing. The functional testing recovery engine 906 can generate and provide recovery input to an applicable engine for controlling testing of software on a virtualized testbed machine, such as the testbed machine operation control engines described in this paper. The functional testing recovery engine 906 can generate recovery input based on recovery strategies. For example, if recovery strategies indicate specific steps to take if a function fails in the execution of software under functional testing, then the functional testing recovery engine 906 can generate recovery input instructing how to take the specific steps indicated by the recovery strategies.

In a specific implementation, the functional testing recovery engine 906 functions to automatically perform recovery of a flow of executing software in functionally testing the software based on output of executing the software in functionally testing the software. The functional testing recovery engine 906 can compare an actual output of executing software with an expected output of executing the software to perform recovery of a flow of execution of the software in functionally testing the software. For example, the functional testing recovery engine 906 can determine ways in which software is not operating as expected, e.g. from functional testing results generated by comparing actual and expected output, and subsequently generate recovery input for use in recovering a flow of execution of the software in functionally testing the software. Additionally, the functional testing recovery engine 906 can use application of computer vision to output of executing software for purposes of functionally testing the software to perform recovery of a flow of execution of the software. For example, the functional testing recovery engine 906 can use an identification that an element is not functioning properly, e.g. as identified by functional testing results and recognized through computer vision, to perform recovery of a flow of execution of the software for purposes of functionally testing the software.

In an example of operation of the example functional flow testing triage system 902 shown in FIG. 9, the recovery strategies datastore 904 stores recovery strategies data indicating recovery strategies to follow in recovery a flow of execution of software under functional testing. In the example of operation of the example system shown in FIG. 9, the functional testing recovery engine 906 automatically performs recovery of the flow of the execution of the software under functional testing according to the recovery strategies indicated by the recovery strategies data stored in the recovery strategies datastore 904.

Figure 10:
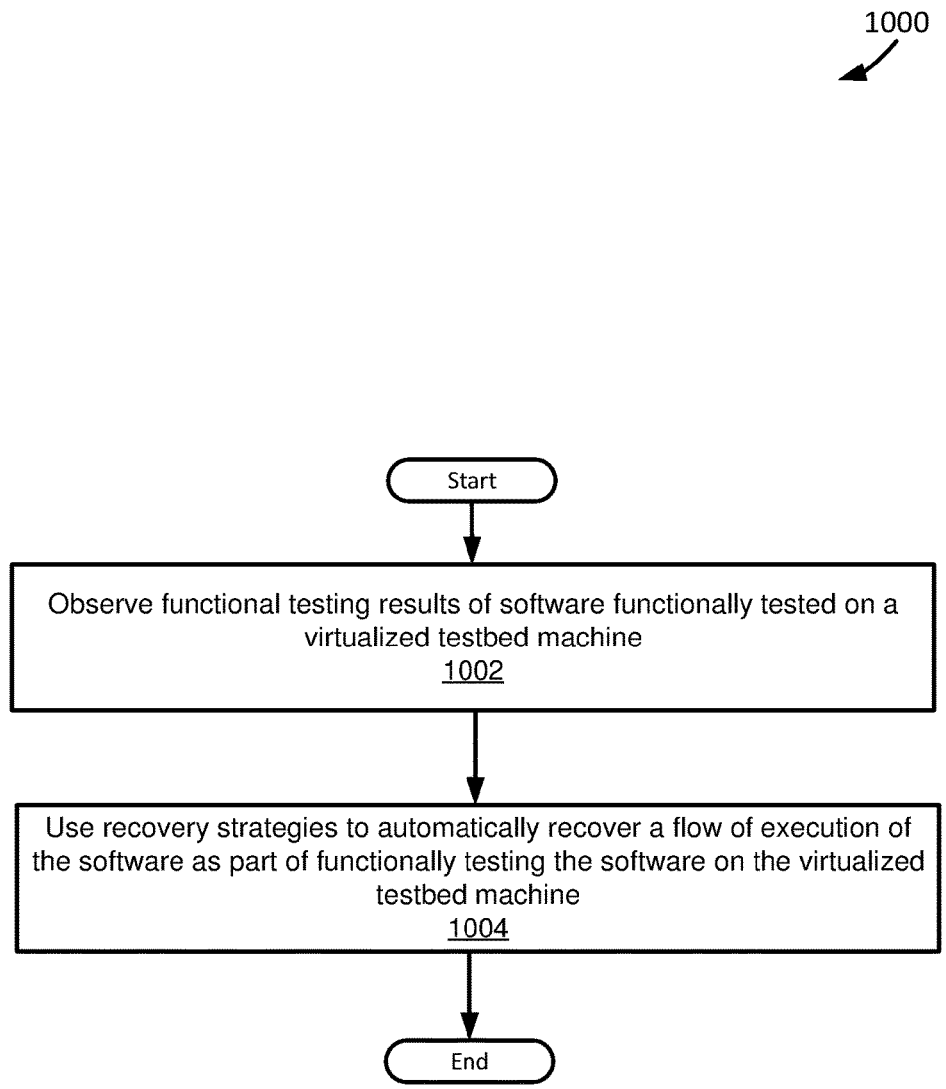
FIG. 10 depicts a flowchart of an example of a method for automatically performing recovery of executing software under functional test.

FIG. 10 depicts a flowchart 1000 of an example of a method for automatically performing recovery of executing software under functional test. The flowchart 1000 begins at module 1002, where functional testing results of software functionally tested on a virtualized testbed machine are observed. An applicable engine for performing automatic recovery of a flow of executing software under functional testing, such as the functional testing recovery engines described in this paper, can observe functional testing results of software functionally tested on a virtualized testbed machine. In observing functional testing results of software functionally testing on a virtualized testbed machine, an output of functionally testing the software can be observed.

For example, a graphical representation of an output of functionally testing software on a virtualized testbed machine can be observed.

The flowchart 1000 continues to module 1004, where recovery strategies are used to automatically recover a flow of execution of the software as part of functionally testing the software on the virtualized testbed machine. An applicable engine for performing automatic recovery of a flow of executing software under functional testing, such as the functional testing recovery engines described in this paper, can use recovery strategies to automatically recover a flow of execution of the software as part of functionally testing the software on the virtualized testbed machine. For example, recovery input can be generated based on recover strategies and subsequently provided for use in automatically recovering a flow of execution of the software as part of functionally testing the software on the virtualized testbed machine.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

I claim:

1. A method comprising:
   presenting to a user through a client device a graphical representation of an output of executing software;
   capturing at least one image of physical movement made by the user interacting with the graphical representation of the output of the executing software;
   applying computer vision to the at least one image to identify graphical elements in the graphical representation of the output of the executing software;
   applying computer vision to the at least one image to identify user interactions with the graphical elements in the graphical representation of the output of the executing software based on the graphical elements identified in the graphical representation of the output of the executing software;
   receiving user input indicating functions associated with elements of the software including the graphical elements for use in executing the software;
   generating a script package based on the user interactions with the graphical elements in the graphical representation of the output of the executing software and the user input indicating the functions associated with the elements of the software for use in executing the software, the script package including script capable of being executed in functionally testing the software;
   functionally testing the software on at least one virtualized testbed machine using the script package;
   generating output of functionally testing the software by functionally testing the software using the script package;
   performing functional testing analysis of the software by applying computer vision to a graphical representation of the output of functionally testing the software to determine at least one of a degree to which the graphical representation of the output of functionally testing the software changes compared to an expected output of functionally testing the software and a frequency at which the graphical representation of the output of functionally testing the software changes compared to a graphical representation of the expected output of functionally testing the software, said at least one of the degree to which the output of functionally testing the software changes and the frequency at which the graphical representation of the output of functionally testing the software changes used to generate functional testing analytics data included as part of functional testing results.

2. The method of claim 1, wherein the script package includes testing input used to control execution of the software on the at least one virtualized testbed machine, the testing input determined based on the user interactions with the graphical elements in the graphical representation of the output of the executing software.

3. The method of claim 1, further comprising:
   receiving the user input including a test harness for controlling functional testing of the software;
   generating the script package based on the test harness to include testing input generated based on the test harness.

4. The method of claim 1, wherein
   the functional testing analysis of the software is performed by applying the computer vision to the output of functionally testing the software to generate functional testing analytics data included as part of functional testing results.

5. The method of claim 1, wherein
   the functional testing analysis of the software is performed by applying the computer vision to the output of functionally testing the software to determine differences between the output of functionally testing the software and an expected output of functionally testing the software, the differences used to generate functional testing analytics data included as part of functional testing results.

6. The method of claim 1, wherein
   the functional testing analysis of the software is performed to determine the degree to which the graphical representation of the output of functionally testing the software changes.

7. The method of claim 1, wherein
   the functional testing analysis of the software is performed to determine the frequency at which the graphical representation of the output of functionally testing the software changes.

8. The method of claim 1, further comprising:
   generating functional testing results of functionally testing the software on the at least one virtualized testbed machine, the functional testing results including data used to reproduce a graphical representation of the output of functionally testing the software;
   providing the functional testing results to the client device for use in presenting the graphical representation of the output of functionally testing the software to the user through the client device.

9. The method of claim 1, further comprising:
   generating functional testing results of functionally testing the software on the at least one virtualized testbed machine, the functional testing results including the script in the script package;
   providing the functional testing results to the client device for use in presenting a graphical representation of the script to the user through the client device.

10. The method of claim 1, further comprising automatically performing recovery of a flow of execution of the script in the script package according to recovery strategies during the course of functionally testing the software.

11. A system comprising:
a client device configured to present to a user a graphical representation of an output of executing software;
an event capture engine configured to capture at least one image of physical movement made by the user interacting with the graphical representation of the output of the executing software;
a user interaction identification engine configured to:
  apply computer vision to the at least one image to identify graphical elements in the graphical representation of the output of the executing software;
  apply computer vision to the at least one image to identify user interactions with the graphical elements in the graphical representation of the output of the executing software based on the graphical elements identified in the graphical representation of the output of the executing software;
a testing communication engine configured to receive user input indicating functions associated with elements of the software including the graphical elements for use in executing the software;
a functional testing computer vision-based testing package generation engine configured to generate a script package based on the user interactions with the graphical elements in the graphical representation of the output of the executing software and the user input indicating the functions associated with the elements of the software for use in executing the software, the script package including script capable of being executed in functionally testing the software;
a testbed machine operation control engine configured to functionally test the software on at least one virtualized testbed machine using the script package, and generate output of functionally testing the software by functionally testing the software using the script package;
a functional testing analysis engine configured to perform functional testing analysis of the software by applying computer vision to a graphical representation of the output of functionally testing the software to at least one of a degree to which the graphical representation of the output of functionally testing the software changes compared to an expected output of functionally testing the software and a frequency at which the graphical representation of the output of functionally testing the software changes compared to a graphical representation of the expected output of functionally testing the software, said at least one of the degree to which the output of functionally testing the software changes and the frequency at which the graphical representation of the output of functionally testing the software changes used to generate functional testing analytics data included as part of functional testing results.

12. The system of claim 11, wherein the script package includes testing input used to control execution of the software on the at least one virtualized testbed machine, the testing input determined based on the user interactions with the graphical elements in the graphical representation of the output of the executing software.

13. The system of claim 11, further comprising:
the testing communication engine further configured to receive the user input including a test harness for controlling functional testing of the software;
the functional testing computer vision-based testing package generation engine further configured to generate the script package based on the test harness to include testing input generated based on the test harness.

14. The system of claim 11, wherein
the functional testing analysis engine is configured to perform the functional testing analysis of the software to generate functional testing analytics data included as part of functional testing results.

15. The system of claim 11, wherein
the functional testing analysis engine is configured to perform the functional testing analysis of the software to determine differences between the output of functionally testing the software and an expected output of functionally testing the software, the differences used to generate functional testing analytics data included as part of functional testing results.

16. The system of claim 11, wherein
the functional testing analysis engine is configured to perform the functional testing analysis of the software to determine the degree to which the graphical representation of the output of functionally testing the software changes.

17. The system of claim 11, wherein
the functional testing analysis engine is configured to perform the functional testing analysis of the software to determine the frequency at which the graphical representation of the output of functionally testing the software changes.

18. The system of claim 11, wherein
the functional testing analysis engine is configured to generate functional testing results of functionally testing the software on the at least one virtualized testbed machine, the functional testing results including data used to reproduce a graphical representation of the output of functionally testing the software;
a testbed machine communication engine configured to provide the functional testing results to the client device for use in providing the graphical representation of the output of functionally testing the software to the user through the client device.

19. The system of claim 11, further comprising a functional testing recovery engine configured to automatically perform recovery of a flow of execution of the script in the script package according to recovery strategies during the course of functionally testing the software.

20. A system comprising:
means for presenting to a user through a client device a graphical representation of an output of executing software;
means for capturing at least one image of physical movement made by the user interacting with the graphical representation of the output of the executing software;
means for applying computer vision to the at least one image to identify graphical elements in the graphical representation of the output of the executing software;
means for applying computer vision to the at least one image to identify user interactions with the graphical elements in the graphical representation of the output of the executing software based on the graphical elements identified in the graphical representation of the output of the executing software;
means for receiving user input indicating functions associated with elements of the software including the graphical elements for use in executing the software;
means for generating a script package based on the user interactions with the graphical elements in the graphical representation of the output of the executing software and the user input indicating the functions associated with the elements of the software for use in executing the software, the script package including script capable of being executed in functionally testing the software;

means for functionally testing the software on at least one virtualized testbed machine using the script package;

means for generating output of functionally testing the software by functionally testing the software using the script package;

means for performing functional testing analysis of the software by applying computer vision to a graphical representation of the output of functionally testing the software to determine at least one of a degree to which the graphical representation of the output of functionally testing the software changes compared to an expected output of functionally testing the software and a frequency at which the graphical representation of the output of functionally testing the software changes compared to a graphical representation of the expected output of functionally testing the software, said at least one of the degree to which the output of functionally testing the software changes and the frequency at which the graphical representation of the output of functionally testing the software changes used to generate functional testing analytics data included as part of functional testing results.

* * * * *